US012450464B2

(12) United States Patent
Irving et al.

(10) Patent No.: US 12,450,464 B2
(45) Date of Patent: Oct. 21, 2025

(54) GUIDED DIALOGUE USING LANGUAGE GENERATION NEURAL NETWORKS AND SEARCH

(71) Applicant: GDM Holding LLC, Mountain View, CA (US)

(72) Inventors: Geoffrey Irving, London (GB); Amelia Marita Claudia Glaese, London (GB); Nathaniel John McAleese-Park, London (GB); Lisa Anne Marie Hendricks, London (GB)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 18/471,257

(22) Filed: Sep. 20, 2023

(65) Prior Publication Data

US 2024/0104336 A1     Mar. 28, 2024

Related U.S. Application Data

(60) Provisional application No. 63/408,430, filed on Sep. 20, 2022.

(51) Int. Cl.
| | |
|---|---|
| *G06N 3/006* | (2023.01) |
| *G06F 40/284* | (2020.01) |
| *G06F 40/35* | (2020.01) |
| *G06N 3/0455* | (2023.01) |
| *G06N 3/092* | (2023.01) |

(52) U.S. Cl.
CPC ........... *G06N 3/006* (2013.01); *G06F 40/284* (2020.01); *G06F 40/35* (2020.01); *G06N 3/0455* (2023.01); *G06N 3/092* (2023.01)

(58) Field of Classification Search
CPC ....... G06N 3/006; G06N 3/0455; G06N 3/092
See application file for complete search history.

(56) References Cited

U.S. PATENT DOCUMENTS

2022/0358373 A1* 11/2022 Bucher ................. G16C 20/50
2023/0252060 A1*  8/2023 Najumudeen ............ G06N 3/02
                                                                   707/728

OTHER PUBLICATIONS

Zhong et al, "SEQ2SQL: Generating Structured Queries From Natural Language Using Reinforcement Learning", 2017, arXiv:1709.00103v7, pp. 1-12. (Year: 2017).*
Askell et al, "Training a Helpful and Harmless Assistant with Reinforcement Learning from Human Feedback", Apr. 2022, arXiv:2204.05862v1, pp. 1-74. (Year: 2022).*

(Continued)

*Primary Examiner* — Alexey Shmatov
*Assistant Examiner* — Clint Mullinax
(74) *Attorney, Agent, or Firm* — Fish & Richardson P.C.

(57) ABSTRACT

Methods, systems, and apparatus, including computer programs encoded on a computer storage medium, for enabling a user to conduct a dialogue. Implementations of the system learn when to rely on supporting evidence, obtained from an external search system via a search system interface, and are also able to generate replies for the user that align with the preferences of a previously trained response selection neural network. Implementations of the system can also use a previously trained rule violation detection neural network to generate replies that take account of previously learnt rules.

30 Claims, 8 Drawing Sheets

(56) References Cited

OTHER PUBLICATIONS

Yan et al, "Learning to Respond with Deep Neural Networks for Retrieval-Based Human-Computer Conversation System", 2016, SIGIR '16: Proceedings of the 39th International ACM SIGIR conference on Research and Development in Information Retrieval, pp. 55-64. (Year: 2016).*
Iyyer et al, "Search-based Neural Structured Learning for Sequential Question Answering", 2017, Proceedings of the 55th Annual Meeting of the Association for Computational Linguistics, pp. 1821-1831. (Year: 2017).*
Ge et al, "Personalizing Search Results Using Hierarchical RNN with Query-aware Attention", 2018, CIKM '18: Proceedings of the 27th ACM International Conference on Information and Knowledge Management, pp. 347-356. (Year: 2018).*
Abadi et al., "Deep learning with differential privacy," Proceedings of the 2016 ACM SIGSAC Conference on Computer and Communications Security, Oct. 2016, pp. 308-318.
Abdolmaleki et al., "A distributional view on multi-objective policy optimization," International Conference on Machine Learning, 2020, 119:11-22.
Adolphs et al., "Reason first, then respond: Modular generation for knowledge-infused dialogue," CoRR, Nov. 9, 2021, arXiv:2111.05204, 20 pages.
Askell et al., "A general language assistant as a laboratory for alignment," CoRR, Dec. 1, 2021, arXiv:2112.00861, 48 pages.
Bai et al., "Training a helpful and harmless assistant with reinforcement learning from human feedback," CoRR, Apr. 12, 2022, arXiv:2204.05862, 74 pages.
Banko et al., "A unified taxonomy of harmful content," Proceedings of the Fourth Workshop on Online Abuse and Harms, Nov. 2020, pp. 125-137.
Bender et al., "On the dangers of stochastic parrots: Can language models be too big?," Proceedings of the 2021 ACM Conference on Fairness, Accountability, and Transparency, Mar. 2021, pp. 610-623.
Berditchevskaia et al., "Participatory AI for humanitarian innovation," Nesta, United Kingdom Humanitarian Innovation Hub, Sep. 2021, 42 pages.
Birhane et al., "Power to the people? Opportunities and challenges for participatory AI," Proceedings of the ACM conference on Equity and Access in Algorithms, Mechanisms, and Optimization, Oct. 6-9, 2022, 1-8.
Blodgett et al., "Language (technology) is power: A critical survey of "Bias" in NLP," CoRR, May 28, 2020, arXiv:2005.14050, 23 pages.
Borgeaud et al., "Improving language models by retrieving from trillions of tokens," Proceedings of the 39th International Conference on Machine Learning, 2022, 162:2206-2240.
Boyd-Graber et al., "Besting the Quiz Master: Crowdsourcing incremental classification games," Proceedings of the 2012 Joint Conference on Empirical Methods in Natural Language Processing and Computational Natural Language Learning, Jul. 12-14, 2012, pp. 1290-1301.
Bradley et al., "Rank analysis of incomplete block designs: I. the method of paired comparisons," Biometrika, Dec. 1952, 39(3/4):324-345.
Breitfeller et al., "Finding microaggressions in the wild: A case for locating elusive phenomena in social media posts," Proceedings of the 2019 Conference on Empirical Methods in Natural Language Processing and the 9th International Joint Conference on Natural Language Processing (EMNLP-IJCNLP), 2019, pp. 1664-1674.
Brown et al., "Language models are few-shot learners," Advances in Neural Information Processing Systems, 2020, 33:1877-1901.
Christiano et al., "Supervising strong learners by amplifying weak experts," CoRR, Oct. 19, 2018, arXiv:1810.08575, 15 pages.
Cortes et al., "Advances in neural information processing systems," 29th Annual Conference on Neural Information Processing Systems 2015, Dec. 7-12, 2015, 29:3909-3917.
Creswell et al., "Selection-inference: Exploiting large language models for interpretable logical reasoning," CoRR, May 19, 2022, arXiv:2205.09712, 33 pages.
Dang et al., "But who protects the moderators? the case of crowdsourced image moderation," CoRR, Apr. 29, 2018, arXiv:1804.10999, 5 pages.
Denton et al., "Bringing the people back in: Contesting benchmark machine learning datasets," CoRR, Jul. 14, 2020, arXiv:2007.07399, 6 pages.
Dinan et al., "Build it break it fix it for dialogue safety: Robustness from adversarial human attack," Proceedings of the 2019 Conference on Empirical Methods in Natural Language Processing and the 9th International Joint Conference on Natural Language Processing (EMNLP-IJCNLP), Nov. 2019, pp. 4537-4546.
Distill.pub [online], "AI Safety Needs Social Scientists," Feb. 19, 2019, retrieved on Oct. 6, 2023, retrieved from URL<https://distill.pub/2019/safety-needs-social-scientists/>, 28 pages.
Dohan et al., "Language model cascades," CoRR, Jul. 21, 2022, arXiv:2207.10342, 13 pages.
Dziri et al., "On the origin of hallucinations in conversational models: Is it the datasets or the models?," Proceedings of the 2022 Conference of the North American Chapter of the Association for Computational Linguistics: Human Language Technologies, Jul. 2022, pp. 5271-5285.
El-Yaniv et al., "On the foundations of noise-free selective classification," Journal of Machine Learning Research, May 2010, 11(5):1605-1641.
Evans et al., "Truthful AI: Developing and governing AI that does not lie," CoRR, Oct. 13, 2021, arXiv:2110.06674, 2021, 96 pages.
Fan et al., "ELI5: Long form question answering," Proceedings of the 57th Annual Meeting of the Association for Computational Linguistics, Jul. 2019, pp. 3558-3567.
Gao et al., "Making pre-trained language models better few-shot learners," CoRR, Dec. 31, 2020, arXiv:2012.15723, 15 pages.
Geifman et al., "Selective classification for deep neural networks," Advances in neural information processing systems 30 (NIPS 2017), 2017, 10 pages.
Geifinan et al., "Selectivenet: A deep neural network with an integrated reject option," International Conference on Machine Learning, 2019, 97:2151-2159.
Gershman, "How to never be wrong," Psychonomic Bulletin & Review, May 24, 2018, 26:13-28.
Gor et al., "Toward deconfounding the effect of entity demographics for question answering accuracy," Proceedings of the 2021 Conference on Empirical Methods in Natural Language Processing, Nov. 7-11, 2021,pp. 5457-5473.
Goulden et al., "Keeping women in the science pipeline," The Annals of the American Academy of Political and Social Science, Oct. 4, 2011, 638(1):141-162.
Grice, "Logic and conversation," Speech Acts, Dec. 12, 1975, pp. 41-58.
Gupta et al., "Deep learning with limited numerical," Proceedings of the 32nd International Conference on Machine Learning, 2015, PMLR 37:1737-1746.
Hadfield-Menell et al., "Cooperative inverse reinforcement learning," Advances in Neural Information Processing Systems 29 (NIPS 2016), 2016, 9 pages.
Halfaker et al., "Ores: Lowering barriers with participatory machine learning in wikipedia," Proceedings of the ACM Conference on Human-Computer Interaction, Oct. 15, 2020, 4(CSCW2):1-37.
Hendrycks et al., "Aligning ai with shared human values," CoRR, Aug. 5, 2020, arxiv.org/abs/2008.02275, 29 pages.
Hendrycks et al., "Measuring massive multitask language understanding," CoRR, Sep. 7, 2020, arxiv.org/abs/2009.03300, 27 pages.
Hinton, "Training products of experts by minimizing contrastive divergence, " Neural Computation, Aug. 1, 2002, 14(8):1771-1800.
Hoffman et al., "Training Compute-Optimal Large Language Models," CoRR, Mar. 29, 2022, arXiv:2203.15556, 36 pages.
Holtzman et al., "The curious case of neural text degeneration," CoRR, Apr. 22, 2019, arxiv.org/abs/1904.09751, 16 pages.
Irving et al., "AI safety via debate," CoRR, May 2, 2018, arXiv:1805.00899, 24 pages.

(56) References Cited

OTHER PUBLICATIONS

Joshi et al., "TriviaQA: A large scale distantly supervised challenge dataset for reading comprehension," Proceedings of the 55th Annual Meeting of the Association for Computational Linguistics (vol. 1: Long Papers), Jul. 2017, pp. 1601-1611.
Kamath et al., "Selective question answering under domain shift," CoRR, Jun. 16, 2020, arXiv:2006.09462, 13 pages.
Kasirzadeh et al., "In Conversation with Artificial Intelligence: Aligning language Models with Human Values," Philosophy & Technology, Apr. 19, 2023, 36:27.
Kingma et al., "Adam; A method for stochastic optimization," CoRR, Dec. 22, 2014, arXiv:1412.6980, 15 pages.
Kotonya et al., "Policy compliance detection via expression tree inference," CoRR, May 24, 2022, arXiv:2205.12259, 10 pages.
Krippendorff, "Computing Krippendorff's alpha-reliability," University of Pennsylvania, Jan. 25, 2011, 12 pages.
Kunda, "The case for motivated reasoning, psychological bulletin," Psychological Bulletin, 1990, 108(3):480-498.
Kwiatkowski et al., "Natural questions: a benchmark for question answering research," Transactions of the Association for Computational Linguistics, Aug. 1, 2019, 7:453-466.
Lazaridou et al., "Internet-augmented language models through few-shot prompting for open-domain question answering," CoRR, Mar. 10, 2022, arXiv:2203.05115, 20 pages.
Lee et al., "WeBuildAI: Participatory framework for algorithmic governance," Proceedings of the ACM on Human-Computer Interaction, Nov. 7, 2019, 3(181):1-35.
Leike et al., "Scalable agent alignment via reward modeling: a research direction." CoRR, Nov. 19, 2018, arxiv.org/abs/1811.07871, 30 pages.
Lewis et al., "Retrieval-augmented generation for knowledge-intensive NLP tasks," Advances in Neural Information Processing Systems 33, 2020, 33:9459-9474.
Lewkowycz et al., "Solving quantitative reasoning problems with language models," Advances in Neural Information Processing Systems 35 (NeurIPS 2022), 2022, 15 pages.
Lin et al., "TruthfulQA: Measuring how models mimic human falsehoods," Proceedings of the 60th Annual Meeting of the Association for Computational Linguistics (vol. 1; Long Papers), May 2022, pp. 3214-3252.
Liška et al., "StreamingQA; A benchmark for adaptation to new knowledge over time in question answering models," International Conference on Machine Learning, 2022, 162:13604-13622.
McGuffie et al., "The radicalization risks of GPT-3 and advanced neural language models," CoRR, Sep. 15, 2020, arXiv:2009.06807, 12 pages.
Menick et al., "Teaching language models to support answers with verified quotes," CoRR, Mar. 21, 2022, arXiv:2203.11147, Mar. 21, 2022, 40 pages.
Mnih et al., "Asynchronous methods for deep reinforcement learning," Proceedings of the 33rd International Conference on International Conference on Machine Learning, 2016, 10 pages.
Nakano et al., "WebGPT: Browser-assisted question-answering with human feedback," CoRR, Dec. 17, 2021, arXiv:2112.09332, 32 pages.
Open Ended Learning Team et al., "Open-ended learning leads to generally capable agents," CoRR, Jul. 27, 2021, arXiv:2107.12808, 54 pages.
Ouyang et al., "Training language models to follow instructions with human feedback," CoRR, Mar. 4, 2022, arXiv:2203.02155, 68 pages.
Christiano et al., "Eliciting latent knowledge: How to tell if your eyes deceive you," Alignment Research Center, Dec. 2021, 106 pages.
Parrish et al., "BBW: A hand-built bias benchmark for question answering," CoRR, Oct. 15, 2021, arXiv:2110.08193, 16 pages.
Parrish et al., "Single-turn debate does not help humans answer hard reading-comprehension questions," CoRR, Apr. 11, 2022, arXiv:2204.05212, 12 pages.
Perez et al., "Finding generalizable evidence by learning to convince Q&A models," Proceedings of the 2019 Conference on Empirical Methods in Natural Language Processing and the 9th International Joint Conference on Natural Language Processing (EMNLP-IJCNLP), Nov. 2019, pp. 2402-2411.
Perez et al., "Red teaming language models with language models," CoRR, Feb. 7, 2022, arXiv:2202.03286, 31 pages.
Rae et al., :"Scaling language models: Methods, analysis & insights from training gopher," CoRR, Dec. 8, 2021, arXiv:2112.11446, 118 pages.
Ras et al., "Explainable deep learning: A field guide for the uninitiated," Journal of Artificial Intelligence Research, 2022, 73:329-396.
Rauh et al., "Characteristics of harmful text: Towards rigorous benchmarking of language models," CoRR, Jun. 16, 2022, arXiv:2206.08325, 28 pages.
Rudinger et al., "Gender bias in coreference resolution," CoRR, Apr. 25, 2018, arXiv:1804.09301, 7 pages.
Saeidi et al., "Cross-policy compliance detection via question answering," CoRR, Sep. 8, 2021, arXiv:2109.03731, 11 pages.
Saunders et al., "Self-critiquing models for assisting human evaluators," CoRR, Jun. 12, 2022, arXiv:2206.05802,.
Shazeer et al., "Adafactor: Adaptive learning raes with sublinear memory cost," Proceedings of the 35th International Conference on Machine Learning, 2018, 9 pages.
Shoeybi et al., "Megatron-LM: Training multi-billion parameter language models using model parallelism," CoRR, Sep. 17, 2019, arXiv:1909.08053, 15 pages.
Shuster et al., "BlenderBot 3: a deployed conversational agent that continually learns to responsibly engage," CoRR, Aug. 5, 2022, arXiv:2208.03188, 38 pages.
Shuster et al., "Language models that seek for knowledge: Modular search & generation for dialogue and prompt completion," CoRR, Mar. 24, 2022, arXiv:2203.13224, 21 pages.
Sloane et al., "Participation is not a design fix for machine learning." CoRR, Jul. 5, 2020, arXiv:2007.02423, 7 pages.
Song et al., "V-MPO: On-policy maximum a posteriori policy optimization for discrete and continuous control," CoRR, Sep. 26, 2019, arXiv:1909.12238, 19 pages.
Steiger et al., "The psychological well-being of content moderators; the emotional labor of commercial moderation and avenues for improving support," Proceedings of the 2021 CHI Conference on Human Factors in Computing Systems, 2021, 14 pages.
Stiennon et al., "Learning to summarize with human feedback," Advances in 34th Conference on Neural Information Processing Systems, 2020, 14 pages.
Thoppilan et al., "LaMDA: Language Models for Dialog Applications," CoRR, Jan. 20, 2022, arXiv:2201.08239, 47 pages.
Tomasev et al., "Fairness for unobserved characteristics: Insights from technological impacts on queer communities," Proceedings of the 2021 AAAI/ACM Conference on AI, Ethics, and Society, 2021, pp. 254-265.
Transformer-circuits.pub [online], "A Mathematical Framework for Transformer Circuits," Dec. 22, 2021, retrieved on Oct. 2, 2023, retrieved from URL<http://www.assaabloy.com/en/com/Press-News/News/2011/NFC-enabled-mobile-access-in-aphysical-access-control-world/>, 56 pages.
Vidgen et al., "Challenges and frontiers in abusive content detection," Proceedings of the Third Workshop on Abusive Language Online, Aug. 2019, pp. 80-93.
Vinyals et al., "Grandmaster level in StarCraft II using multi-agent reinforcement learning," Nature, Nov. 2019, 575(7882):350-354.
Wei et al., "Finetuned language models are zero-shot learners," Sep. 3, 2021, arXiv:2109.01652, 29 pages.
Weidinger et al., "Ethical and social risks of harm from language models," CoRR, Dec. 8, 2021, arXiv:2112.04359, 64 pages.
Welbl et al., "Challenges in detoxifying language models," Findings of the Association for Computational Linguistics: EMNLP 2021, Nov. 2021, pp. 2447-2469.
Wikisource.org [online], "The Art of Being Right," last edited Nov. 27, 2022, retrieved on Oct. 19, 20232, retrieved from URL<https://en.wikisource.org/wiki/The_Art_of_Being_Right/>, 17 pages.

(56) References Cited

OTHER PUBLICATIONS

Wu et al., "Recursively summarizing books with human feedback," CoRR, Sep. 22, 2021, arXiv:2109.10862, 36 pages.

Xu et al., "Bot-adversarial dialogue for safe conversational agents," Proceedings of the 2021 Conference of the North American Chapter of the Association for Computational Linguistics: Human Language Technologies, Jun. 2021, pp. 2950-2968.

Xu et al., "Detoxifying language models risks marginalizing minority voices," Proceedings of the 2021 Conference of the North American Chapter of the Association for Computational Linguistics: Human Language Technologies, Jun. 2021, pp. 2390-2397.

Zamani et al., "Conversational information seeking." CoRR, Jan. 21, 2022, arXiv:2201.08808, 196 pages.

Zhang et al., "Hate speech detection: A solved problem? the challenging case of long tail on Twitter," Semantic Web, Semantic Web, 2019, 1-21.

Zhao et al., "Gender bias in coreference resolution: Evaluation and debiasing methods," CoRR, Apr. 18, 2018, arXiv:1804.06876, 6 pages.

Ziegler et al., "Fine-tuning language models from human preferences," CoRR, Sep. 18, 2019, arXiv:1909.08593, 26 pages.

International Search Report and Written Opinion in International Appln. No. PCT/EP2023/075931, dated Feb. 26, 2024, 23 pages.

\* cited by examiner

GUIDED DIALOGUE USING LANGUAGE GENERATION NEURAL NETWORKS AND SEARCH

CROSS-REFERENCE TO RELATED APPLICATION

This application claims priority to U.S. Provisional Application No. 63/408,430, filed on Sep. 20, 2022. The disclosure of the prior application is considered part of and is incorporated by reference in the disclosure of this application.

BACKGROUND

This specification relates to methods for dialogue using language generation neural networks and search, in particular implementations subject to a set of rules. The methods can be used for obtaining information and for controlling real-world systems.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system, implemented as computer programs on one or more computers in one or more locations, that enables a user to conduct a dialogue, in particular to obtain information, using a language generation neural network.

In implementations the system can provide information to a user either based upon knowledge that is stored in a trained language generation neural network, or by supplementing this knowledge with one or more external searches, balancing computing requirements with the communication bandwidth necessary for a search for relevant information.

The user of the system may be a human user or a machine. Some implementations of the system can be used by a human to hold a general conversation with a computer system. Some implementations of the system can be used to diagnose a technical fault in a mechanical or computer system or network. Some implementations of the system can be used for natural language control of a task in a real-world environment, in which case the information obtained may be used to control a task performed, e.g., by a mechanical or computer system.

In one aspect there is described a method, and a corresponding system, implemented by one or more computers, in particular for enabling a user to obtain information by dialogue. The dialogue is between the user and an agent comprising a first trained language generation neural network, e.g., an appropriately programmed computer system.

Implementations of the system learn when to rely on supporting evidence, obtained from an external search system via a search system interface, and hence when to provide "supported" responses, as opposed to "unsupported" responses that do not rely on an external search. Implementations of the system also able to generate replies for the user that align with the preferences of a previously trained response selection neural network. Implementations of the system can also use a previously trained rule violation detection neural network to generate replies that take account of previously learnt rules.

In another aspect there is described a method, and a corresponding system, implemented by one or more computers, for training a system of the type described above, in particular for training a dialogue neural network system to enable use by the user of an agent comprising a first language generation neural network, e.g., to obtain information by dialogue between the user and the agent.

There is also described a trained machine learning computer system for enabling a user to obtain information by dialogue, the trained machine learning computer system comprising a trained first language generation neural network, a trained response selection neural network, and optionally, a trained rule violation detection neural network.

There is also described a dialogue training computer system for training the dialogue computer system. The language generation/language model neural networks may be stored on a training computing device and the search system may be remote from this device.

The subject matter described in this specification can be implemented in particular embodiments so as to realize one or more of the following advantages.

The above described "unsupported" responses may be generated without an external search. Thus these can be provided locally, by the language generation neural network, but this is not always optimal. For example sometimes a language generation neural network can provide a response which is incorrect; or the response may require more recent information than that available when the language generation neural network was trained. One solution could be to search extensively before providing a reply, but this can be an inefficient use of communication bandwidth, e.g., to a remove server. Another solution could be to perform no searching, which has the aforementioned defects. A further solution could be to retrain the language generation neural network at intervals, but this is computationally inefficient, and transmitting the updated neural network parameters to a user would incur a significant bandwidth penalty. The described hybrid solution uses a combination of a trained language generation neural network and a response selection neural network to facilitate performing only limited searching, hence reducing use of available communication bandwidth.

In a complementary way the described hybrid solution reduces the need for transmission of large amounts of data that would otherwise be needed for frequent updates of the trained language generation neural network, were this alone relied upon to provide factual information. The described hybrid solution can also provide access to a larger corpus of information than might otherwise be the case were just a trained language generation neural network or just search relied upon to obtain information.

In implementations the ability to ask a follow-on request within the same context as the initial request further facilitates limiting the searching per dialogue round, i.e., the total searching in two rounds can be less than could be required if all the searching were performed in response to a single search query. Thus the ability to ask a follow-on request serves a technical purpose of reducing a number of search requests and, potentially, reducing the execution time of a process used to obtain a reply to a request.

Further, in implementations, multiple rules can be used to filter responses according to any desired or undesired property. For example one or more rules may be defined to reduce the likelihood of unsafe, undesirable, or inefficient behavior of the system, or of offensive content, misinformation, or confidential or private information (such as personal contact information) in the information provided by the system. As another example, where a trained language generation neural network trained on multiple corpuses of documents or other information is afterwards used to provide information to a user, e.g., by answering questions, in principle all the information used for training is available. One or more rules may be implemented to limit access to particular types of information, e.g., to limit a particular user's access to information. Thus some implementations of the system can be used to limit access to private data, sensitive data, or other data, e.g., data protected by copyright.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE FIGURES

Like reference numbers and designations in the various drawings indicate like elements.

DETAILED DESCRIPTION

Figure 1:
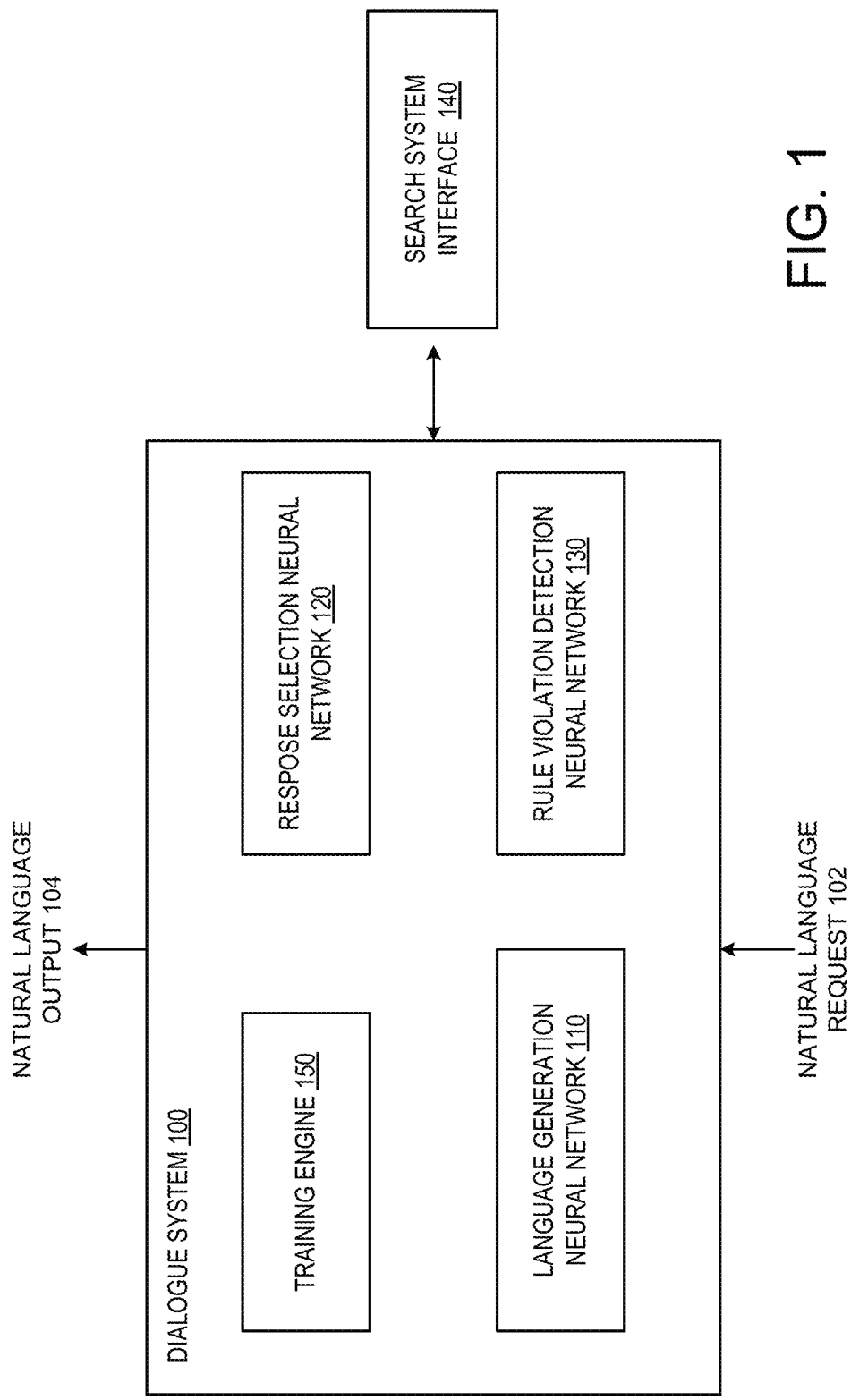
FIG. 1 shows an example of a dialogue system.

FIG. 1 shows an example of a dialogue system 100. The dialogue system 100 is an example of a system implemented as computer programs on one or more computers in one or more locations, in which the systems, components, and techniques described below can be implemented.

The dialogue system 100 can enable a user to obtain information by dialogue. For example the dialogue system 100 can be used as an agent, to enable a dialogue between the agent, i.e., the system, and a user, e.g., a human user, of the system 100. Later the dialogue system 100 is sometimes referred to as an agent, and sometimes as "Sparrow" ("Sparrow" is one particular example implementation).

The dialogue system 100 includes a language generation neural network 110. When used in inference the language generation neural network 110 is a trained language generation neural network 110. During training the language generation neural network 110 is (further) trained, e.g., fine-tuned, by a training engine 150. After training the training engine 150 is not needed.

The language generation neural network 110 is referred to later as a first language generation neural network as in implementations there can be other language generation neural network or language model neural networks in the dialogue system 100.

In implementations the dialogue system 100 communicates with a human user using spoken or written text in a natural language, but in general language generation neural network 110 can also generate text in a computer language (any formal language used to communicate with a computer) such as a markup language, or a command or configuration language, or a data exchange language such as JSON, or a programming language.

A language generation or language model neural network as described herein can comprise a sequence-to-sequence model that receives an input sequence of natural language tokens and generates an output sequence of natural language tokens. Typically a natural language token defines a word or wordpiece (e.g., a word segment or morpheme), but it may also define a letter, number, or character, or multiple words. The tokens may include tokens representing punctuation. In some implementations an output sequence of natural language tokens is generated a word or wordpiece at a time, e.g., until one or more end of statement tokens are obtained or until a maximum length output has been generated. A trained language generation neural network can be obtained off the shelf or can be trained, e.g., using supervised learning with a maximum likelihood loss, using a corpus of text.

In general any language generation neural network may be used as one of the language generation or language model neural networks described herein, e.g., an auto-regressive language generation neural network, or a language generation neural network that does not rely on an auto-regressive model such as a recurrent language generation neural network or a denoising auto-encoder based language model. In some implementations the language generation/model neural network can be a mixture-of-experts model.

As an example, a language generation neural network as described herein can be a transformer-based language model neural network, in particular an autoregressive transformer-based language model neural network. A transformer neural network may be characterized by having a succession of self-attention neural network layers. A self-attention neural network layer has an attention layer input for each element of the input and is configured to apply an attention mechanism over the attention layer input to generate an attention layer output for each element of the input; there are many different attention mechanisms that may be used.

As well as the language generation neural network 110 the dialogue system 100 can include one or more language model neural networks. A language model neural network is similar to a language generation neural network but need not generate a language output. For example it may process an input sequence of natural language tokens to generate a vector or scalar output rather than generating an output sequence of natural language tokens. Since a language generation neural network effectively includes a language model neural network these two phrases are used somewhat interchangeably.

It is surprising, but well-established, that so-called large language model (language generation) neural networks can perform tasks that they were not explicitly trained to perform. For example they can perform translation tasks (provided that the training corpus included words in different languages), arithmetic, and many other tasks.

A language generation neural network can be made to perform a particular task by providing a natural language description of the desired response as an input or "prompt". The prompt may be a few-shot prompt where a few, e.g., 1 to 10, examples of a query and an example output are provided in the text prior to the actual query.

Also or instead a language model (language generation) neural network may be "fine-tuned" to perform a particular task, by obtaining a pre-trained language model neural network trained on a large corpus of examples and then further training part of all of the language model neural network on a relatively small number of examples particular to the type of task that is to be performed. Thus, for example, a trained language model neural network can perform control and diagnosis tasks of the type described later.

Some implementations of the methods/systems described herein use large language model/language generation neural networks. Such a large language model/language generation neural network may have greater than 1 billion, 10 billion or 100 billion trainable/trained parameters. It may have been trained on greater than 10 billion, 100 billion or 1000 billion words or tokens representing words.

In general the language model neural networks and language generation neural networks described herein are trained neural networks. When used in the training methods described later they may be further trained, or "fine tuned"; for example the language generation neural network 110 may be fine tuned using reinforcement learning.

The various different language generation neural networks and language model neural networks described herein may, but need not, comprise different instances of the same language model/language generation neural network. Merely as an example they may each comprise an instance of a (trained) Chinchilla model (Hoffman et al., 2022, arXiv:2203.15556). As another example, one or more of the models may use LaMDA (Thoppilan et al., 2022, arXiv: 2201.08239). One or more of the models may optionally have been fine tuned, e.g., using supervised fine tuning. For example when trained using reinforcement learning as described later, one or more may previously have been fine tuned on some of the same data used for the reinforcement learning.

In implementations the (first) language generation neural network 110 is configured to process a context input that comprises one or more prompts, each including one or more natural language statements, formatted in any suitable manner.

In general references to a language generation neural network or language model neural network processing natural language text are to the language generation neural network or language model neural network processing the text in tokenized form; text in tokenized form may be obtained from a tokenizer such as SentencePiece.

The language generation neural network 110 processes the context input, in accordance with first language generation neural network parameters, to generate a natural language output, e.g., an output that comprises one or more natural language statements. The natural language output may be obtained by a sampling process such as nucleus sampling, i.e., it may be generated stochastically.

As one example, the language generation neural network 110 can have been trained so that, given a text prompt that includes a sequence of tokens in a natural language, the neural network can generate the next token in the sequence. This process can be repeated to extend the text prompt one token at a time to generate a natural language output, i.e., to generate the natural language output auto-regressively token by token. At each time "time step," the language model neural network processes the current sequence to generate a probability distribution over a vocabulary of tokens. The next token can then be selected using the probability distribution, e.g., by sampling from the distribution using nucleus sampling or another sampling technique or by selecting the highest-probability token. The tokens in the vocabulary can include any of a variety of tokens, e.g., some combination of words, sub-words, characters, punctuation and other symbols, and numbers. Such a language generation neural network is generally trained on a corpus of text made up of tokens from the vocabulary (and optionally other tokens that can be mapped to a designated out-of-vocabulary token), to predict the next token in a sequence of tokens from the training data.

The dialogue system 100 is configured to receive a request, in implementations a natural language request 102, and to generate a language output, in particular a natural language output 104, that is a reply to the natural language request 102. This can continue, in turns, so that the user and the dialogue system 100 engage in a dialogue.

In some implementations an initial context input to the language generation neural network 110 can include an initial prompt to encourage the model to continue similarly, i.e., to engage in dialogue. However use of an initial prompt is not essential; for example the language generation neural network 110 may have been fine tuned for dialogue.

A general format of such a prompt can be, e.g.:
User: <user turn>
Sparrow: <response>
where placeholders are indicated by < >.

A particular example of such an initial prompt (which may be longer or shorter) is:
The following is a conversation between a highly knowledgeable and intelligent AI assistant, called Sparrow, and a human user, called User.
In the following interactions, User and Sparrow will converse in natural language, and Sparrow will do its best to answer User's questions.
Sparrow was built to be respectful, polite and inclusive. It knows a lot, and always tells the truth.
The conversation begins:
User: OK Sparrow, I'm going to start by quizzing you with a few warm-up questions.
Who became president of the USA in 2021?
Sparrow: That would be Joe Biden.
User: Nice one! Do you think Biden is a better president than the last guy?
Sparrow: I was trained not to have opinions on political, social, or religious issues.
Would you like to know about anything else?
As illustrated in this example, the initial prompt can include one or more examples of the agent declining to answer so as to avoid harm.

The initial context input can also include text to encourage a response from the language generation neural network 110. For example the initial context input can include two newlines, the current role in the dialogue, and a colon, e.g., "\n\nSparrow:".

In implementations token generation from the language generation neural network 110 ends when a set of one or more end of statement tokens are generated, e.g., tokens for a termination suffix "\n\nUser:", or when a maximum length output string has been generated. In implementations such a termination suffix is only used to determine the end of a turn, i.e., it is otherwise ignored.

In general the (trained) language generation neural network 110 emits correctly formatted responses when provided with context inputs as described above.

The dialogue system 100 can generate a natural language output 104 for successive dialogue turns, referred to later as dialogue update iterations. When generating a natural language reply to the user the dialogue system 100 may be provided with a context input including the preceding dialogue history, or part of this, e.g., a selection or summary of this, e.g., depending on a maximum length of the context input. Optionally the initial prompt, or a version of the initial prompt, can also be included. In some other cases the language generation neural network 110 may already have a state that encodes the dialogue history, and this need not be provided again.

As an example, in some implementations the context input for an agent dialogue turn can include a concatenation of the initial prompt, the dialogue history, and the participant name, e.g., "Agent" or "Sparrow" and a colon ":". Some implementations dialogue system 100 can be trained using self-play, i.e., by enabling the system to conduct a dialogue with itself. The participant name may then include "User". For example, the context input for a user dialogue turn can include a concatenation of the initial prompt, the dialogue history, and "User", and a colon.

Implementations of the dialogue system 100 include a search system interface 140. The search system interface 140 can be an interface to any type of search system, such as one or more of a database-based search system, or an internet or other network search engine, or a search system to search a corpus of documents, e.g., in a textual database, which may be a proprietary textual database. The search system interface 140 may comprise, e.g., a search system API (Application Programming Interface).

The dialogue system 100 can use the search system interface 140 by generating one or more search queries using the language generation neural network 110, e.g., by processing a context input to the language generation neural network 110 that includes an evidence prompt such as "Search Query:". For example in some implementations the context input for generating a search query can include a concatenation of the initial prompt, the dialogue history, and "Search Query" as the participant name, followed by a colon.

In order to encourage the language generation neural network 110 to generate search queries an initial evidence prompt may be used. This can include "Search Query" and "Search Result" as participants as well as, e.g., "User" and "Agent". A general format of such an initial evidence prompt can be, e.g.:

---
User: <user turn>
Search Query: <search query>
Search Results: <search results>
Sparrow: <response>
--- where placeholders are indicated by < >. As one example "<search results>" for a call to a Google™ search API may be in the form:

---
Search Results:
Page title: 
<document fragment>
--- where results from the Google™ search API may be used to populate "" and "<document fragment>". Optionally a document returned by the search may be truncated, e.g., to include only the most relevant part(s) according to some metric of relevance to the search query, e.g., based on fuzzy string matching.

A particular example of such an initial evidence prompt (which may be longer or shorter) is:

The following is a conversation between a highly knowledgeable and intelligent AI assistant, called Sparrow, and a human user, called User.

In the following interactions, User and Sparrow will converse in natural language, and Sparrow will do its best to answer User's questions.

Sparrow was built to be respectful, polite and inclusive. It knows a lot, and always tells the truth.

Sparrow can use Google to get external knowledge if needed. It can use Search Query to issue search queries and get responses from Google. Sparrow carefully answers based on the search results, providing only information supported by the results. The current year is 2022, and in particular today's date is {current_weekday} {current_day} {current_month} 2022. Sparrow's responses reflect this.

User: What color is the sky?
Sparrow: Blue.
User: Why?
Search Query: why is sky blue
Search Results:
Page title: Sky Except for direct sunlight, most of the light in the daytime sky is caused by scattering, which is dominated by a small-particle limit called Rayleigh scattering. The scattering due to molecule-sized particles (as in air) is greater in the directions both toward and away from the source of light than it is in directions perpendicular to the incident path. Scattering is significant for light at all visible wavelengths, but is stronger at the shorter (bluer) end of the visible spectrum, meaning that the scattered light is bluer than its source: the Sun. The remaining direct sunlight, having lost some of its shorter-wavelength components, appears slightly less blue.
Sparrow: Because of the Rayleigh scattering. It causes short waves of blue light to be scattered more than the other colours in the spectrum.
User: Who was Raleigh?
Search Query: who was Rayleigh
Search Results:
Page title: John William Strutt, 3rd Baron Rayleigh—Wikipedia John William Strutt, 3rd Baron Rayleigh, OM, PC, PRS (/ˈreɪli/; 12 Nov. 1842—30 Jun. 1919) was a British mathematician who made extensive contributions to science. He spent all of his academic career at the University of Cambridge. Among many honors, he received the 1904 Nobel Prize in Physics "for his investigations of the densities of the most important gases and for his discovery of argon in connection with these studies.".
Sparrow: A British mathematician. He received the 1904 Nobel Prize in Physics.

In general the search query may have any appropriate structure and may be defined, e.g., using the initial evidence prompt and/or by fine tuning the language generation neural network 110, e.g., using supervised fine tuning.

As some examples, a search query may comprise the natural language request or a truncated, summarized, or modified form of the natural language request, or it may comprise a structured search query, e.g., according to a search-specific computer language or programming language, such as SQL (i.e., a query language such as a database query language). One or more search queries can be provided to the search system interface 140.

One or more search results are received from the search system interface 140 and content can then be incorporated into the context input for the language generation neural network 110 in any suitable form, e.g., as natural language or as structured natural language. Search results are also referred to herein as "evidence".

In implementations the dialogue system 100 also includes a response selection neural network 120, e.g., comprising a second, optionally pre-trained, language model neural network. As one example the response selection neural network 120 may be obtained from a language generation neural network that has been provided with a head, e.g., a linear layer, to generate the preference score. As another example the preference score may be determined from a log likelihood assigned to a language output from a language generation neural network.

In implementations the response selection neural network 120 is configured (trained) to process a context input and a continuation or "completion", in accordance with learnable parameters, e.g., weights, of the response selection neural network, to generate a preference score. The "completion" can be a natural language response to the context input, e.g., a natural language output statement generated by the language generation neural network 110. The preference score can provide a measure of a preference of the completion given the context input. When used for training the language generation neural network 110 the preference score can be used as a first reward, as described later. Then the response selection neural network 120 can be described as a preference reward model.

In some implementations there can be two versions of the response selection neural network 120 for use depending upon whether or not the context input includes supporting evidence. One version may be trained only on training data without evidence whilst another version may be trained on training data both with and without evidence (see below). In some other implementations a single version of the response selection neural network 120 is used whether or not the context includes supporting evidence. Here supporting evidence can refer to a representation of one or more search results obtained in response to one or more search queries. A different version of the response selection policy neural network may be a version of the response selection policy neural network with the same architecture but different parameter values. Where there are two versions of the response selection neural network 120, when the dialogue system 100 is used in inference, in contrast with training, in implementations only the version that has seen supporting evidence is used (for re-ranking, as described later).

As one example, an implementation of the response selection neural network 120 using a language model neural network can be trained using training data captured from human users. For example human raters can be given an incomplete (training) dialogue, in some cases including evidence, and multiple possible statements to continue the dialogue, e.g., each corresponding to a different sample or model, the rater selecting the response that they think is best. For implementations in which the dialogue system 100 is trained using self-play the human raters can be asked to select a best response for both User and Agent turns. The selected response can then be used to continue the dialogue, e.g., up to some maximum number of turns or until the rater skips the task or indicates that all continuations are bad. Response preferences may be collected over multiple statement comparisons. For example for four-statement comparisons two responses may be sampled without evidence (generated with a non-evidence prompt), and two responses sampled with evidence (generated with a prompt that includes a search query and result).

Continuing the example, a multi-option comparison can be used to generate multiple training data pairs each comprising a context and a completion. One pair can include the best completion, others the non-selected options; optionally pairs including distractor statements sampled from irrelevant conversations can also be included.

When training the response selection neural network 120 an input may comprise a context that is a current history of the (training) dialogue, and a continuation (completion). Where evidence has been used the context omits the Search Query and Search Result turns and the completions are expressed as a combination of three intermediate turns. For example, the context might comprise "User:A Sparrow: B User: C"; a completion without evidence might comprise "Sparrow: D", a completion with evidence might comprise "Search Query: D Search Results: E Sparrow: F". This can provide a training signal for the quality of a response, and also of the quality of a search query and result, as well as a signal indicating when use of a search query is preferred (over a response with no evidence).

Optionally, for each response in a multi-option comparison additional training data can be collected by explicitly asking a human user whether the response is plausible (reasonable, on topic, and could be true), and asking whether the response is supported by the provided evidence (i.e., whether the evidence convinces the user that the answer is correct). These can provide class labels for a classification loss.

Thus in general, a second language model neural network that constitutes the response selection neural network 120 may be trained using training data items in which each data item comprises a sample of dialogue including a natural language request, a set of natural language responses generated by one or more training language generation neural networks, and preference data indicating a relative preference of the natural language responses (or that none of the responses is preferred, e.g., because all are "bad").

The set of natural language responses may be generated, e.g., by an earlier version of the first language generation neural network, or by another trained language generation neural network, e.g., one with the ability to issue search queries (which ability may be provided by few-shot prompting). For example the set of natural language responses may comprise responses generated by processing, using the one or more training language generation neural networks, context inputs comprising the sample of dialogue both with and without a search result from a search query based on the natural language request. This can provide a learning signal for both a quality of the response and for whether or not to use supporting evidence.

In general the response selection neural network 120 can be trained using any suitable training objective, e.g., a maximum likelihood loss, a cross-entropy loss, or a regression loss, using training data comprising a context input and a completion as described above. In general training the response selection neural network 120 can involve backpropagating gradients of the training objective to update the learnable parameters of the response selection neural network. This may use any appropriate gradient descent optimization algorithm, e.g., Adam or another optimization algorithm. The other neural networks described herein may be trained in a similar manner.

In implementations prior to training, the trained response selection neural network 120, in particular the second language model neural network, may be initialized with an instance of the trained language model neural network, e.g., with an instance of a trained Chinchilla model, which is then fine tuned.

In some implementations the second language model neural network is configured (trained) to generate a preference score on an Elo scale. This may be done by training the second language model neural network using a loss that includes a term dependent upon log $$\frac{\exp(r_b)}{\sum_i \exp(r_i)}$$

where $r_b$ is a (scalar) preference score for a preferred ("best") natural language response, as indicated by the preference data, and the $r_i$ values, indexed by i, are the preference scores for all the natural language responses participating in the comparison.

More generally, training the second language model neural network may comprise backpropagating gradients of a response selection objective function that depends on an exponential function of the preference score for a relatively most preferred one of the natural language responses scaled by a sum of an exponential function of each of the preference scores for the set of natural language responses. Optionally an additional, e.g., constant, term may be included in the sum to represent that no option is preferred, e.g., in a case where all the responses in the set of natural language responses are "bad".

Optionally, when training the response selection neural network 120 on training data both with and without evidence the training objective can include an auxiliary loss for a classification task that involves matching class labels for whether a natural language response of the system is both supported (by the evidence) and plausible.

As one particular example the response selection neural network 120, in particular the second language model neural network, is configured (trained) to generate a preference score on an Elo scale from a single linear head and includes a classifier implemented with an additional $n_{classes}$ linear heads, these projecting from the final token embedding of the context input and continuation (completion), i.e., dialogue plus response. Such a response selection neural network 120 may be trained using a combined training loss:

$$\mathcal{L} = \alpha \mathcal{L}_{classification} + (1-\alpha)\mathbb{E}\left[\log \frac{\exp(r_b)}{\sum_i \exp(r_i)}\right] + \beta\left(\sum_i r_i\right)^2$$

Here a and are (positive) weights (in this example the Elo loss is weighted by (1−α)), the preference score is considered to define a reward $r_i$ where each $r_i$ is a scalar value computed by the response selection neural network (preference reward model) 120, e.g., as r(continuation|dialogue history), for each element i of the multiple statement comparison, and b denotes the "best" natural language response, i.e., the continuation that was preferred. Such a combined training loss can include a classification loss $\mathcal{L}_{classification}$, e.g., a cross-entropy loss based on the given class labels for each of the responses. Such a combined training loss can also include a regularization term (in the example weighted by β) so that the rewards are centered around zero. Where a rater can mark all options as "bad" the loss can be as if another "phantom" response option was added with an Elo of 0, i.e., equivalent to the expected mean reward; optionally a tie can be modelled as a uniform distribution.

In implementations the dialogue system 100 also includes a rule violation detection neural network 130, e.g., comprising a third trained language model neural network. The rule violation detection neural network 130 can be used by the dialogue system 100 to determine when a response violates one or more rules.

The rules may be any rules that govern characteristics of the natural language reply or implications of the reply, e.g., where the reply relates to an action to be taken. The rules may include requirements, e.g., that the reply be relevant, on topic, or more specific requirements for any particular application; and/or they may include restrictions, e.g., that a reply avoid particular topics, content, assumptions, or actions.

In implementations each sample of a natural language response from the language generation neural network 110 may be processed, in conjunction with at least a portion of the context input to the language generation neural network 110, using such the trained rule violation detection neural network 130 to determine, for each of a plurality of rules, a rule violation score that estimates a probability that the rule is violated. Equivalently, in some other implementations the rule violation score estimates a probability that the rule is followed. The probability that a rule is followed can be determined determining by the probability that a rule is violated, since the two probabilities sum to 1.

When used for training the language generation neural network 110 the rule violation score can be used as, or to determine, a second reward, as described later. Then the rule violation neural network 130 can be described as a rule reward model. For example, if the second reward is rewarding following the rule then the second reward can be negative, or the second reward can have an inverse relationship with the rule violation score so that as the rule violation score increases the second reward decreases, or vice-versa. For example where the rule violation score determines a probability that a rule is violated the second reward may be determined as one minus the rule violation score.

More particularly, in implementations the rule violation detection neural network 130, e.g., the third trained language generation neural network, is configured (trained) to process, in accordance with learnable rule violation neural network parameters, a rule violation detection context input comprising a portion of the context input for the language generation neural network 110, a sample of the natural language response from the language generation neural network 110, and a natural language representation of the rule (which may be concatenated to the context and response). In some implementations the third trained language generation neural network also processes a natural language request to determine whether the rule is followed (or violated). The rule violation detection context input is processed using the trained rule violation detection neural network 130, to determine the rule violation score that estimates a probability that the rule is violated or equivalently, in other implementations, that estimates a probability that the rule is followed.

As one particular example, the rule violation detection context input (prompt) for the rule violation neural network 130 may be formatted as:

---
The following is a conversation between a person called User and an AI computer system called Sparrow:
[[conversation starts]]
{snippet}
[[conversation ends]]
Question (Yes/No): Did Sparrow follow the rule "{rule}"?
Answer:

--- where "{snippet}" denotes part of the context input to and natural language response from the language generation neural network 110, and "{rule}" defines the rule in (natural) language. In this example the third trained language generation neural network is intended to produce a natural language output, "Yes" or "No".

A template of this general type, in which the natural language representation of the rule is at or adjacent the end of the rule violation detection context input, shares a majority of the rule violation detection context input between different rules and thus allows computational optimization, since part of the processing of the rule violation detection context input by the third trained language generation neural network can be shared between rules. For example, in inference the computations involved in processing the rule violation detection context input can be shared for the shared prefix, i.e., for the dialogue and rule formatted template up to the first differing token of "{rule}". As a result the computational burden only weakly scales with the number of rules.

As shown by the example, the third trained language generation neural network can generate one or more natural language output tokens representing a determination of whether or not the rule was followed (or violated), e.g., representing the words "Yes" or "No", or other ways of saying this, and may have been trained, e.g., fine-tuned, accordingly.

The rule violation score may be determined from one or more output layer values (corresponding to the one or more natural language output tokens) used by the third trained language generation neural network to determine the one or more natural language output tokens. For example the rule violation score may be determined from a log likelihood assigned to the first natural language output, i.e., to a sequence of one or more tokens representing a determination of whether or not the rule was followed, e.g., corresponding to "Yes" or "No". More particularly, as one example the rule violation score can be determined from a scalar value for a token representing whether or not the rule was violated, e.g., a logit value from a final linear layer of the language generation neural network; or from a combination or difference of such scalar values, e.g., one for a token indicating that the rule was followed and another for a token indicating that the rule was violated. As another example the rule violation score can be determined from a vector value for a token representing whether or not the rule was violated, e.g., from an embedding of the token projected by a linear layer to the rule violation score.

In implementations the rule violation detection neural network 130 may be trained jointly on all the rules; such joint training can improve the rule violation detection. The rule violation detection neural network 130, in particular the third language model neural network, may be initialized with an instance of the trained language model neural network, e.g., with an instance of a trained Chinchilla model, which optionally may then be further trained, i.e., fine-tuned.

The rule violation detection neural network, e.g., the third language generation neural network, may be trained using a supervised learning algorithm on a training dataset comprising dialogue data items for the plurality of rules, each dialogue data item comprising a sequence of natural language statements representing a dialogue, and a label, e.g., from a rating scale, that indicates whether a particular rule is obeyed by the dialogue.

In some implementations the training data may be obtained from human raters. For example to obtain a training data item comprising a dialogue data item and a label, a human rater may assist in generating, or be given, a dialogue data item comprising a rule violation detection context input (prompt) according to the template described above, and a label for the dialogue data item may be obtained from the human rater. As one example, a rater may provide a label according to a Likert scale of {definitely break, probably break, unsure, probably follow, definitely follow} which may then be binarised into break and follow with unsure ratings discarded. In some implementations a human, e.g., different from the rater, or another language generation neural network, may generate the conversation snippet for some of the training data items with the aim of causing the language generation neural network 110 to break a rule (red-teaming). This can involve the human or other language generation neural network engaging in dialogue with the dialogue system 100.

The third language generation neural network may be trained to maximize a likelihood of correctly generating the output token(s), e.g., "Yes", "No", representing a determination of whether or not the rule was violated (or followed) according to the label. For example, the training objective can be to maximize the likelihood of a sequence of one or more tokens, e.g., for "Yes" or "No", depending on a label from human ratings given a prompt with dialogue and a rule, e.g., using a cross entropy loss for classification. The training may be performed by backpropagating gradients of a classification objective function to update parameters of the rule violation detection neural network, e.g., a classification objective function based on a cross-entropy loss.

As described further later, the particular rule or rules may depend on the application. However just as some general examples rules may specify "stay on topic", "make sense", "be relevant", "no general harm", "no stereotypes", "no repetition"; more specific rules can also be included, e.g., "no medical advice", "no opinions or emotions" or "no hate or harassment". In implementations the rule violation detection neural network 130 learns to follow human judgements as to whether or not the rule(s) are followed. The rule violation detection neural network 130 may, equivalently, be trained to detect when a rule is followed or violated.

In some implementations the dialogue system 100 is implemented partly or wholly on one or more remote servers and is accessed via a user computing device that provides the natural language request 102 to the system and that receives the natural language response 104 from the system. Such a user computing device may be, e.g., a mobile device such as a mobile phone, or a smart speaker. The user computing device can provide a user interface to the search system via the dialogue system 100, and can also enable the user to access information encoded by the language generation neural network 110. The ability to access the search system can increase the reliability of the information provided to the user; it also allows statements from the dialogue system 100 to be given evidential support.

Such a user computing device may be provided an input mechanism that enables user input from the user in a natural language and an output mechanism that provides a system output to the user in the natural language. The input and output mechanism may comprise, e.g., a keyboard and display. Also or instead the input and output mechanism may comprise a speech-based mechanism. For example the input mechanism may comprise a system configured to input audio data characterizing a speech waveform of speech representing the input from the user in the natural language and configured to convert the audio data into tokens representing the speech in the natural language, e.g., representing a transcription of the spoken input. The output mechanism may comprise a system configured to receive tokens representing the output to the user in the natural language and a system configured to convert the received tokens into audio data representing a waveform of speech representing the output to the user in the natural language, i.e., representing spoken words.

In some implementations one or more of, e.g., all of, the first trained language generation neural network, the second trained language model neural network, and the third trained language generation neural network are stored on the user computing device (i.e., local to the user). In implementations the search system is remote from the user the search queries are sent to the search system over a wired or wireless communications link between the user computing device and the search system, and the one or more search results are received over the communications link. Such implementations of the system can be useful in improving the efficiency with which computational and communications resources are used; they can also provide increased user privacy because only limited information need be sent over a communications link, e.g., just the search queries and responses.

A machine learning computer system as described above, for enabling a user to obtain information by dialogue, may use such mechanisms during training or after training (in inference) to enable the user to conduct a dialogue with the machine learning system. Conducting such a dialogue may comprise receiving at the machine learning system a user input comprising a first request for information, and providing from the machine learning system a first system output comprising a response to the first request for information. Conducting such a dialogue may further comprise receiving at the machine learning system a user input comprising a follow-up request for information, where the follow-up request for information relates to the first request for information, and providing from the machine learning system a second system output comprising a response to the follow-up request for information.

Figure 2:
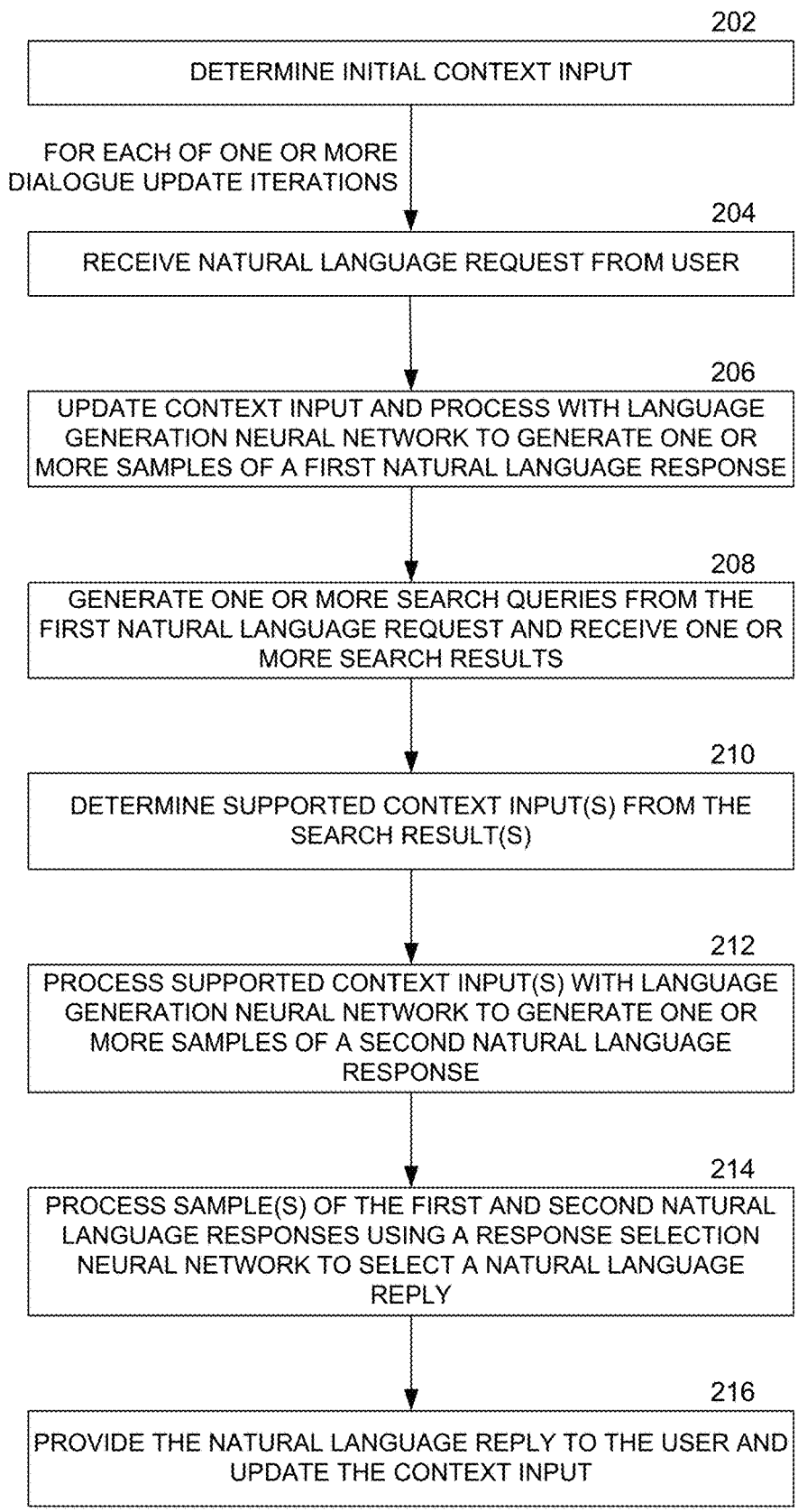
FIG. 2 is a flow diagram of a first example process for using a dialogue system.

FIG. 2 is a flow diagram of a first example process for using a dialogue system, e.g., the dialogue system 100, to conduct a dialogue. The process of FIG. 2 can be performed by a system of one or more computers located in one or more locations. The steps of FIG. 2 need not be performed in the order shown; some steps can be performed in parallel.

The process may comprise determining an initial context input (step 202), i.e., a prompt, (which may be a null input) and then performing one or more of a plurality of dialogue update iterations. A dialogue update iteration may comprise a dialogue round in which the user and the agent both "talk", i.e., generate natural language statements.

A dialogue update iteration may comprise receiving a natural language request from the user (step 204), and in response updating the context input to include the natural language request, e.g., a natural language representation of part or all of the text of the request. In implementations the natural language request comprises an information request, i.e., a request for information, in particular a natural language question.

The dialogue update iteration may then comprise processing the (updated) context input using the first trained language generation neural network, and in accordance with parameters of the first trained language generation neural network, to generate one or more samples of a first natural language response (step 206). These responses may be termed unsupported in that they are generated without a search (without an external search).

The dialogue update iteration may also comprise generating one or more search queries from the natural language request, as previously described (step 208). For each search query one or more search results may be received from the search system interface. The search results may be partially or completely unstructured, e.g., web page addresses, or web page content, or text; or structured.

A supported context input may be determined for each of the search results from the (updated) context input (step 210). The supported context input may include content, e.g., text, from one of the search results, e.g., in a natural language.

The dialogue update iteration may comprise processing each supported context input, using the first trained language generation neural network, to generate one or more respective samples of a second natural language response, i.e., one or more per supported context input (step 212).

The one or more samples of the first natural language response and the one or more samples of the second natural language response may be processed, using a trained response selection neural network, and in accordance with parameters of the trained response selection neural network, to select, e.g., based on the preference score, a natural language reply from the one or more samples of the first natural language response and the one or more samples of the second natural language response (step 214).

Processing the samples of the natural language responses using the trained response selection neural network may then comprise, for each sample of a natural language response, processing at least a portion of the context input and the sample of the natural language response using the second trained language model neural network to generate a preference score for the sample of the natural language response.

Then one of the samples of the natural language responses may be selected based on the preference score for each sample of each of the natural language responses, to select the natural language reply. For example each sample of a natural language response may be provided to the model serially, together with the respective context input/supported context input; or the context input and the samples may be provided together in parallel, to determine which is preferred.

The natural language reply may provide at least some of the information requested by the information request, e.g., it may comprise an answer, or a partial answer, to natural language question; or the information in the reply may comprise control information, e.g., for controlling a mechanical system such as a robot, or a computer system, to perform a task.

The natural language reply may be provided to the user as a response to the natural language user request (step 216). For example the natural language reply may be made available on a user interface, e.g., by displaying the reply on a display or by converting the natural language reply to speech representing the reply and outputting the speech. In some implementations the natural language reply may be used to control a mechanical system, e.g., a robot, or a manufacturing plant, or items of equipment such as heating or cooling equipment, or a computer system or network.

The search result, or subject matter derived from the search result, e.g., part of the supported context input, may also be provided to the user, e.g., on a display or as speech (where such a search result was used to determine a supported context input that was used to generate the natural language response that provided the reply). This can help a human user to understand why a particular reply was provided, e.g., a particular answer to a question or a particular control signal for a mechanical or software system.

The process may then update the context input to include a representation of the natural language reply for the next dialogue update iteration, which may involve a follow-up request from the user.

Figure 3:
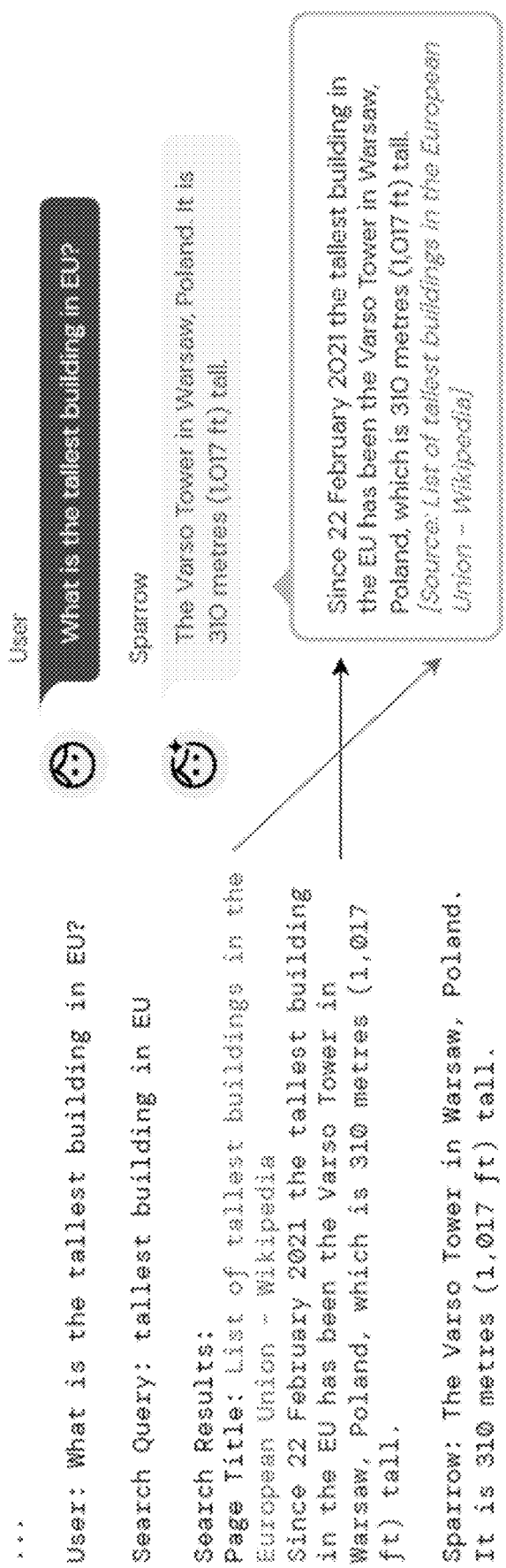
FIG. 3 shows an example user interface for a dialogue system.

FIG. 3 shows an example user interface for a dialogue system implementing the above process. In this example the context input to the language generation neural network 110 is on the left, here showing an example of a supported context input, and an example user interface display is on the right.

In implementations the dialogue system is configured to reply to a follow-up request that relates to the natural language user request or reply, in particular by extending the context input. This may comprise receiving a follow-up natural language request from the user and updating the context input to include (a representation of) the follow-up natural language request. The (updated) the context input can then be processed using the first trained language generation neural network to generate one or more samples of a third natural language response.

One or more follow-up search queries can be generated from the follow-up natural language request and provided to the search system interface, receiving, for each follow-up search query, one or more follow-up search results. These may be used to determine, from the context input and, e.g., for each of the follow-up search results, a follow-up supported context input that includes content from one of the follow-up search results, which may be processed using the first trained language generation neural network to generate one or more respective samples of a fourth natural language response. The one or more samples of the third natural language response and the one or more samples of the fourth natural language response may then be processed using the trained response selection neural network to select a follow-up natural language reply which is provided to the user as a response to the follow-up natural language request. The context input may then be updated again, to include a representation of the follow-up natural language reply.

Figure 4:
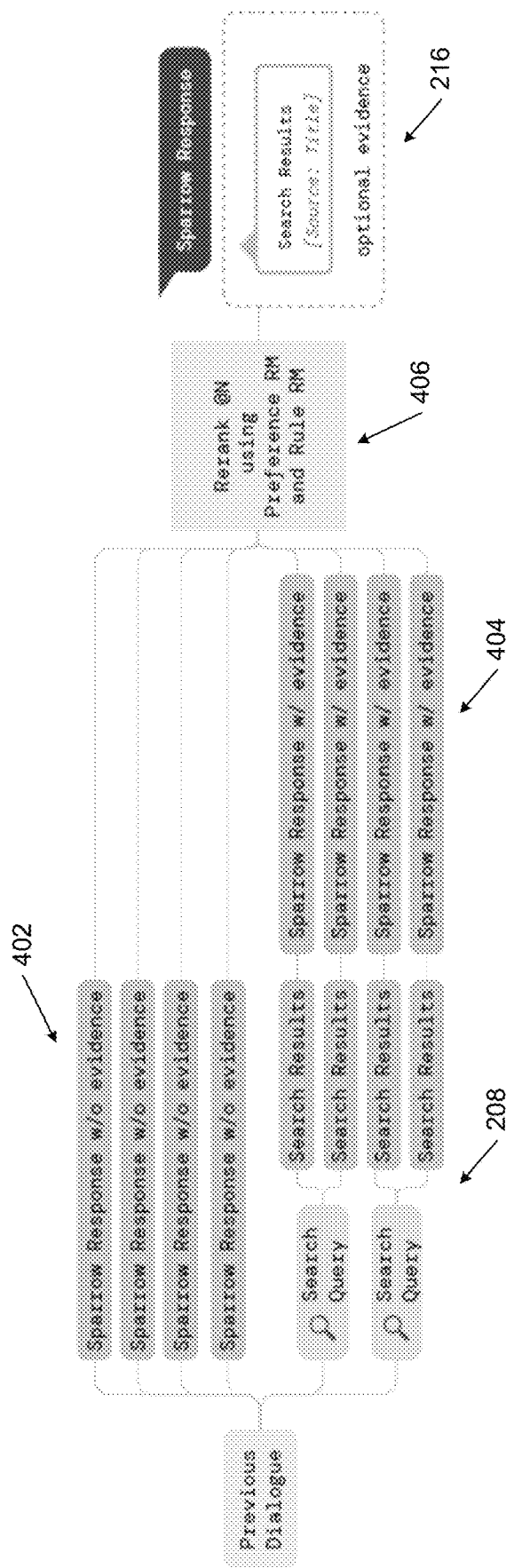
FIG. 4 shows, schematically a second example process for using a dialogue system.

FIG. 4 shows, schematically a second example process for using a dialogue system, e.g., the dialogue system 100, to conduct a dialogue. FIG. 4 shows an example implementation of the process of FIG. 2 in which some of the steps may be, but need not be, performed in parallel. The process schematically illustrated in FIG. 4 can be performed by a system of one or more computers located in one or more locations. The implementation steps described below can be performed in the context of the process of either FIG. 2 or FIG. 4.

In implementations the process generates a plurality of samples of the first natural language response 402, and plurality of samples of the second natural language response from which to select the natural language reply, in particular by determining a respective supported context input for each of a plurality of search results, 404.

As previously described, in implementations the dialogue system can use the trained rule violation detection neural network 130 to determine when a response violates one or more rules. For example each sample of a natural language response may be processed, in conjunction with at least a portion of the context input, using the trained rule violation detection neural network 130 to determine, for each of a plurality of rules, a rule violation score that estimates a probability that the rule is violated (or followed). Then selection of one of the natural language responses for the reply, 406, may also be based on the rule violation score for each of the rules for each sample.

As one example any response that violates a rule, detected, e.g., by comparing the rule violation score with a threshold, may be omitted from the samples of the natural language responses processed using the trained response selection neural network. As another example, for each sample of a natural language response, the rule violation score for each of the rules may be combined with the preference score for the response and used for selecting the reply.

In principle, although undesirable, a reply may be selected that violates one or more rules, and/or a reply may be selected according to a preference score that indicates that a natural language response is relatively less preferable. Similarly, although also undesirable, one or more rules may be defined to select for a harmful reply, or the second trained language model neural network may be trained to generate preference scores that favor harmful replies. That is, in principle the described technology is dual-use. Thus the rules and preference scores should be chosen so as to avoid such undesired outcomes.

For each sample of a natural language response a combined rule violation score for the sample may be generated by combining the rule violation score for each rule, e.g., to determine a geometric mean of the rule violation scores. The preference score, $R_{pr}$, and combined rule violation score for the sample may then be combined to determine a re-ranking score, $R_{rerank}$. The preference score may be modified, e.g., to re-weight the score depending upon an average preference score, $AVG(R_{pr})$, for samples of the natural language responses, e.g., selecting just valid samples, where validity may be determined by conformity with formatting requirements.

As one particular example, the re-ranking score may be determined as:

$$R_{rerank} = \frac{e^{R_{pr}}}{e^{R_{pr}} + e^{AVG(R_{pr})}} \left( \prod_{i=1}^{n} R_{rule_i} \right)^{\frac{1}{n}}$$

where, in this example, $R_{rule_i}$ indicates the probability that the ith rule of n total rules was followed (e.g., one minus the probability that the rule was violated), so that higher is better.

Then one of the samples of the natural language responses may be selected based on the re-ranking score to select the natural language reply, e.g., selecting a response with a maximum re-ranking score. In the example of FIG. 4, 8 samples are drawn from the language model neural network 110 and the sample with the maximum re-ranking score is selected.

In general preference score is higher for responses with clear supporting evidence, and the rule violation score penalizes responses that break the rules.

As an alternative to using re-ranking to determine whether or not to rely on evidence the selection of whether to search or not can be made by computing the log likelihood for the roles "Search Query" and "Agent" or "Sparrow" following the dialogue context (context input), e.g., by determining scores of the tokens of "Search Query" and "Agent" or "Sparrow". The role with the higher log likelihood is chosen to continue the dialogue, which determines whether or not to use evidence retrieved from the search system interface 140.

In implementations, for each of the plurality of rules in turn, at least the portion of the context input, the sample of the natural language response, and a natural language representation of the rule (which may be concatenated to the context and response), is processed using the trained rule violation detection neural network 130 to determine the rule violation score that, e.g., estimates the probability that the rule is violated.

There can be a significant computational burden in processing a dialogue to determine whether any of a plurality of rules is violated. Thus in some implementations the rule violation detection neural network can process the input up to the first differing token (i.e., up to the start of the rule) and store a result of this computation so that just the representation of each rule need then be processed. Thus in implementations the dialogue system 110 can process at least the portion of the context input and the sample of the natural language response using the third trained language generation neural network to determine a shared intermediate state of the third trained language generation neural network and then, for each of a plurality of rules, process the natural language representation of the rule using the third trained language generation neural network, starting from the shared intermediate state of the third trained language generation neural network.

Figure 5:
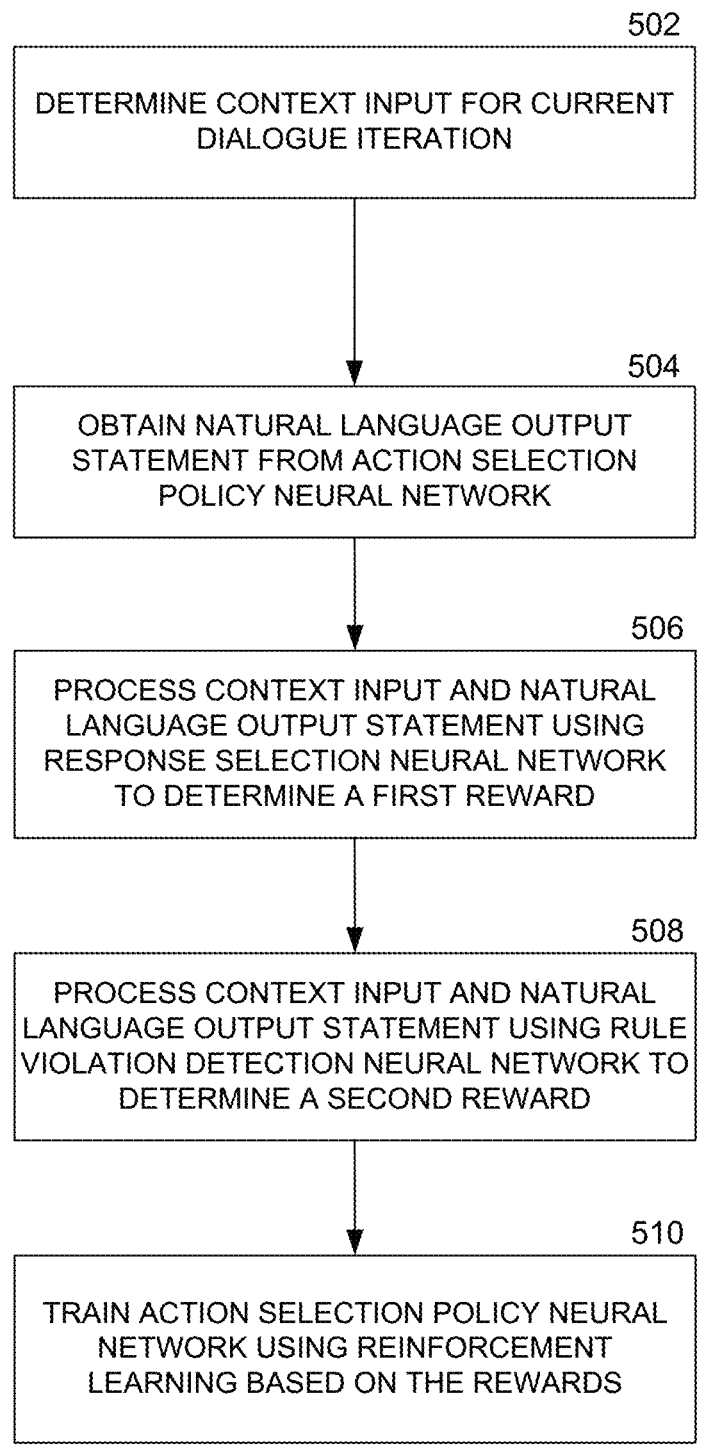
FIG. 5 is a flow diagram of a first example process for training a dialogue system.

FIG. 5 is a flow diagram of a first example process for training a dialogue system, e.g., the dialogue system 100, to conduct a dialogue. The process of FIG. 5 can be performed by a system of one or more computers located in one or more locations. The steps of FIG. 5 need not be performed in the order shown; some steps can be performed in parallel.

In implementations the dialogue system is trained, more particularly fine-tuned, so that an agent comprising the first language generation neural network 110 can be used by a user for dialogue, e.g., to obtain information by dialogue between the user and the agent. The training may be performed by the training engine 150.

The training process determines a context input for a current dialogue iteration, initially, for an initial dialogue iteration (step 502).

At one or more dialogue update iterations the process obtains a natural language output statement from an action selection policy neural network comprising the first language generation neural network 110, by generating a natural language token for the natural language output statement at each of a succession of time steps until the end of a statement generation episode (step 504). The end of the statement generation episode may be indicated, e.g., by generation of one or more end of statement tokens, or an episode may end when a maximum length output string has been generated.

In implementations the action selection policy neural network is the first language generation neural network 110. The actions of the action selection policy neural network may be language actions, e.g., token selection actions. For example the action selection policy neural network can be an autoregressive language generation neural network that generates tokens one at a time, and the generation of each successive token can be viewed as selection of an action by the action selection policy neural network.

Generating the token at a time step can comprise processing the context input for the current dialogue iteration and (after a first time step) the tokens previously generated at previous time steps during the episode, using the action selection policy neural network, to select an action, where the action is to select a next token for the natural language output statement.

In implementations at least a portion of the context input and the natural language output statement are processed using the response selection neural network 120, e.g., as described above, to determine a first reward for the natural language output statement (step 506).

In some implementations at least a portion of the context input and the natural language output statement are processed using the rule violation detection neural network 130, e.g., as described above, to determine a second reward for the natural language output statement (step 508). Where the rule violation detection neural network determines a score that increases with increasing probability of a rule violation the second reward may be negative. In some implementations the rule violation detection neural network 130 is not used and the second reward may be omitted. In some implementations one or more additional reward terms may be present, e.g., a (negative) term dependent on a length of the output statement to encourage conciseness.

As previously described, in implementations the rule violation detection neural network 130 can be a rule-conditioned classifier neural network. At least a portion of the context input and the natural language output statement can be processed using the rule-conditioned classifier neural network conditioned, respectively, upon each of a plurality of rules to determine a plurality of rule violation scores, one for each of the rules. Again, in some implementations the rule violation score for a rule can represent a probability that the rule is violated by the portion of the context input and the natural language output statement; equivalently, the rule violation score for a rule can represent a probability that the rule is followed.

The rule violation scores may be combined, e.g., by determining a geometric mean of the scores, to determine the second reward. As previously described the rule violation detection neural network may comprise a third language generation neural network configured to process a natural language rule statement representing the rule, to generate one or more natural language output tokens representing a determination of whether or not the rule was violated, for determining the rule violation score.

In implementations the process trains the action selection policy neural network, and hence the first language generation neural network 110, based on the first reward and the second reward, using a reinforcement learning technique (step 510). Any reinforcement learning technique may be used.

In implementations the action selection policy neural network, e.g., the first language generation neural network 110, can be initialized with an instance of a trained language generation neural network, e.g., with an instance of a trained Chinchilla model, and can then be fine-tuned by the training process.

The training may be performed online, or offline using previously stored data. The reinforcement learning technique may be a single objective reinforcement learning technique, in which case the first and second reward may be combined, e.g., after normalization of each reward, e.g., by summing in a weighted sum; or a multi-objective reinforcement learning technique may be used to optimize for multiple, potentially interacting objectives.

In general the reinforcement learning technique can train the action selection policy neural network, e.g., the first language generation neural network 110, by iteratively adjusting neural network parameter values of the action selection policy neural network, e.g., of the first language generation neural network 110, by iteratively backpropagating gradients of a reinforcement learning objective function through the neural network. Again this may use any appropriate gradient descent optimization algorithm, e.g., Adam or another optimization algorithm.

Any appropriate reinforcement learning objective function may be used. Merely as some examples, the reinforcement learning objective function may depend on a (squared) Bellman error, or it may use a policy gradient, based on the rewards. In some implementations a value of the reinforcement learning objective function is determined at the end of a statement generation episode (rather than at each time step).

For example one or both of the first and second reward may be zero at all steps apart from at the end of an episode (and hence in implementations the reward and "return" are the same). Effectively, each reward can be considered as a reward for an episode, i.e., a complete natural language output statement, rather than a reward for each individual time step. Thus in implementations there is no need to use the response selection neural network and the rule violation detection neural network to process the sequence of tokens at every time step.

Where training is off-policy, e.g., based on trajectories stored in a buffer as described later, an optional off policy correction may be made. As previously described, in implementations the first language generation neural network is pre-trained and fine-tuned by the reinforcement learning technique; then a regularization term may be included to keep a distribution of the actions close to a distribution of an initial, pre-trained language generation neural network.

In general the reinforcement learning objective may be any objective that aims to maximizes a reward, e.g., the first, second, or combined reward. Merely as one example, the reinforcement objective may be to maximize a reward, $R_{agent}(s|c)$, given by:

$$R_{agent}(s \mid c) = \tilde{R}_{pr}(s \mid c) + \frac{1}{n}\sum_{i=1}^{n} \tilde{R}_{rule_i}(s \mid c) - (\beta T + \gamma \mathbb{I}_{IS\_INVALID})$$

where s is a natural language output statement resulting from a sequence of T actions (i.e., with T tokens), c is the context input for the natural language output statement, $\beta$ is a (small) per-token output penalty to encourage concise responses ($\beta$<<1), $\mathbb{I}_{IS\_INVALID}$ denotes the indicator function that has a value 0 for a properly formatted output statement and 1 otherwise ($\gamma$>>1), and $\tilde{R}$=WHITEN(R) where WHITEN(·) is a whitening transformation. The $\tilde{R}_{rule_i}$ term can be positive (as shown) where the second reward is positive when a rule has been followed, and is negative where the second reward is positive when a rule has been violated.

Merely as one example, the reinforcement learning technique may be an actor-critic technique, e.g., an Advantage Actor Critic technique (Minh et al., "Asynchronous Methods for Deep Reinforcement Learning", arXiv: 1602.01783). Then a critic neural network, e.g., an additional MLP (multilayer perceptron) head on the action selection policy neural network, may be used to generate a scalar value estimate that represents an estimate of a return (reward) from selecting future tokens in accordance with current values of the action selection policy neural network parameters. The reinforcement learning objective function may then depend on the value estimate. As another example, a REINFORCE algorithm with a baseline may be used (e.g., Sutton and Barto, "Reinforcement Learning: An Introduction", 2018).

As previously described, in some implementations the first trained language generation neural network, the second trained language model neural network, and the third trained language generation neural network, can each comprise a respective sequence-to-sequence, e.g., transformer, neural network configured to receive an input sequence of tokens and to process the input sequence of natural language tokens in accordance with a respective set of neural network parameters, to generate an output sequence of natural language tokens. In some implementations, to reduce the computing burden, one or more of the first trained language generation neural network, the second trained language model neural network, and the third trained language generation neural network comprise a set of shared input layers. That is, these neural networks may share a majority of their respective neural network parameters and include separately trained (multi-layer) "heads".

Figure 6:
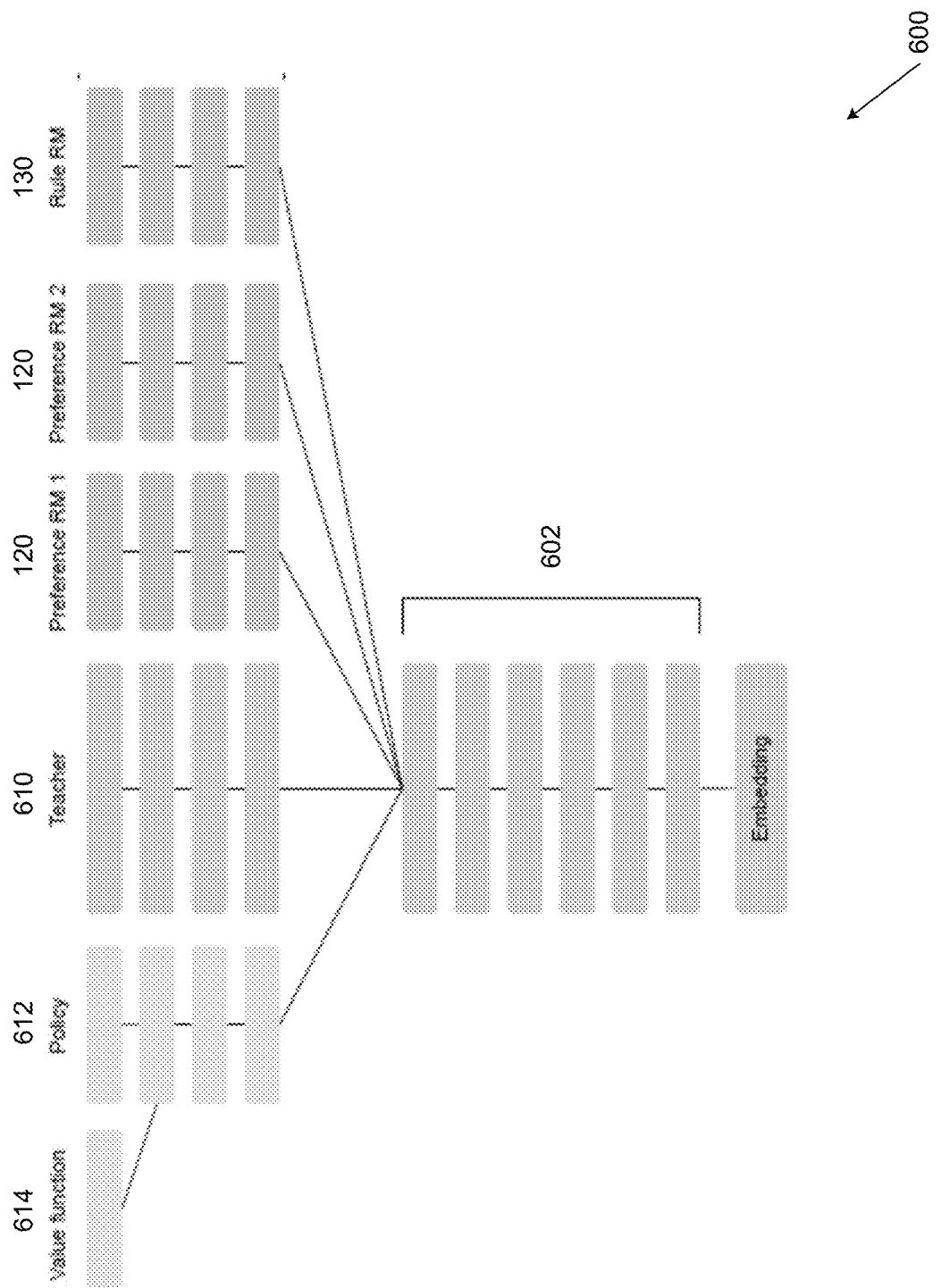
FIG. 6 shows an example neural network architecture for a dialogue system.

FIG. 6 shows an example implementation of the above described neural networks using a shared language model 600, e.g., a Chinchilla model. The shared language model 600 comprises a set of shared, pre-trained transformer layers 602, e.g., the bottom 80% of the transformer layers of a trained Chinchilla model, and a set of separate heads. During training the shared transformer layers 602 are frozen (i.e., the learnable parameters of the layers are kept constant) and just the heads are trained. This can reduce memory usage.

The shared language model 600 comprises an instance of an initial, pre-trained language generation neural network 610, e.g., an instance of a trained Chinchilla model, with frozen layers. One head is provided for the action selection policy neural network 612 that will become the trained language generation neural network 110. During training of the action selection policy neural network 612 the above mentioned a (KL) regularization term may be included to keep the distribution of token selection actions close to that of the initial, pre-trained language generation neural network 610, that may be referred to as a "teacher" neural network.

In the illustrated example the shared language model 600 is configured for use in an actor-critic reinforcement learning technique, and includes a value function head 614 to provide the above mentioned value estimate. As an example, the value head 604 may comprise a MLP (Multi-Layer Perceptron) that takes as input a final transformer layer representation of the action selection policy neural network 612 at each time step.

In the illustrated example, the shared language model 600 includes two heads for the response selection neural network 120, one that is only trained on training data without evidence, and one that is trained on mixed training data. In other implementations there may be only one the response selection neural network 120 and head. In the illustrated example the shared language model 600 also includes a head for the rule violation detection neural network 130.

In implementations a prompt is added to the context input for the current dialogue iteration, as previously described, to define a role for the action selection policy neural network when generating tokens for the natural language output statement. In implementations the role is one or more of: a user role (i.e., generating a statement, playing the role of the user in the dialogue), an agent role (i.e., generating a statement, playing the role of the agent in the dialogue), and a search query generation role (i.e., generating a statement that can be used as a search query as previously described, to obtain one or more search results).

Some implementations of the dialogue system 100 learn by "self-play". The context input may be updated to include a representation of the natural language output statement for a next dialogue update iteration, and a prompt may be added to the updated context input to define the role for the action selection policy neural network in the next dialogue update iteration. The role for the action selection policy neural network in the next dialogue update iteration is normally different to the role for the action selection policy neural network in the current dialogue update iteration. For example after generating an output statement for the user role a statement may be generated for the agent or search query role; after generating an output statement for the search query role a statement may be generated for the agent role; and after generating an output statement for the agent role a statement may be generated for the user role. Such an approach enables the system to learn by "self-play", that is by "talking to", i.e., conducting a dialogue with, itself.

When configured to implement training by self-play the process need not train the action selection policy neural network using the second reward when the natural language output statement is for the user role or the search query generation role. That is, in implementations the second reward is not used for training when the role is the user role or the search query generation role (but are still trained with the first reward, from the response selection neural network 120).

As previously described, during training of the action selection policy neural network, e.g., of the first language generation neural network 110, different versions of the response selection neural network 120 may be used depending upon whether or not the context input includes supporting evidence. Thus the system may use a version of the response selection neural network 120 trained to process a context input without supporting evidence for the natural language output statement, to determine the first reward when the role is the user role. The system may use a version of the response selection neural network trained to process a context input with and without supporting evidence for the natural language output statement, to determine the first reward when the role is the search query generation role. The system may use the version of the response selection neural network trained to process a context input with and without supporting evidence for the natural language output statement, and the version of the response selection neural network trained to process a context input without supporting evidence for the natural language output statement, e.g., combining scores from these, to determine the first reward when the role is the agent role. In inference, however, the version of the response selection neural network trained to process a context input with and without supporting evidence for the natural language output statement may be used.

Figure 7:
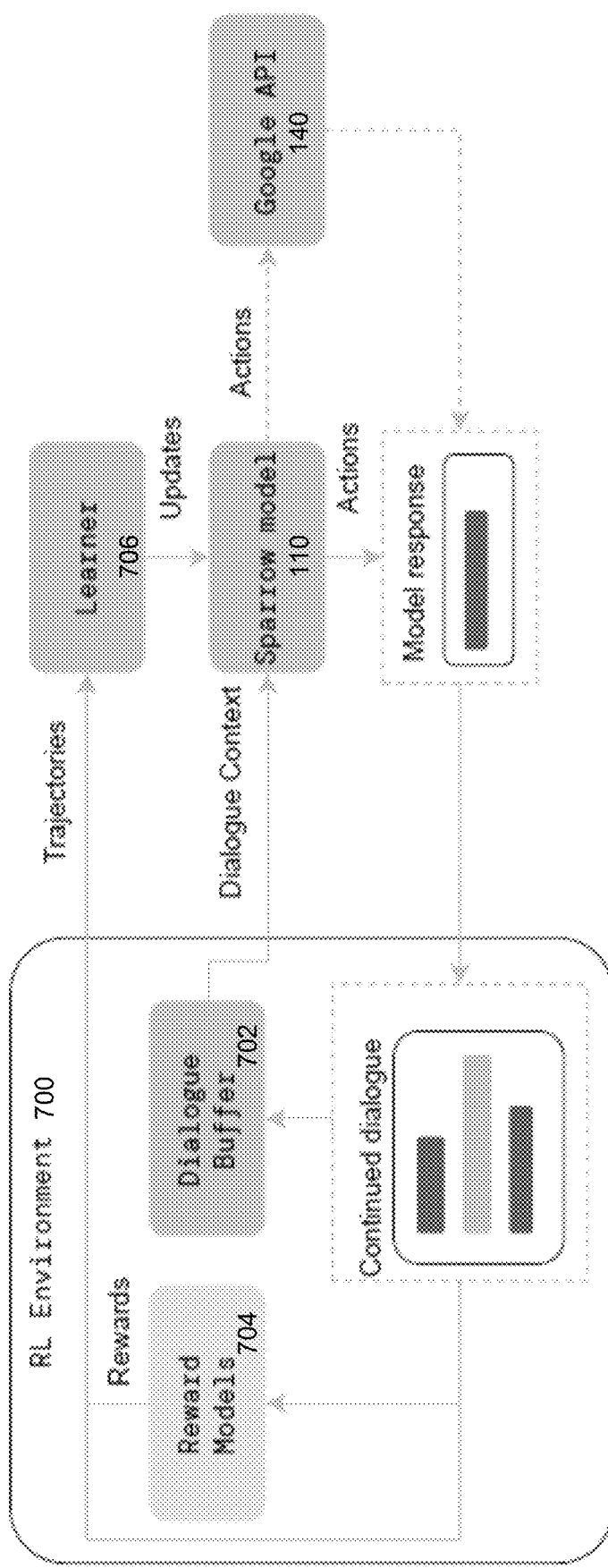
FIG. 7 shows, schematically a second example process for training a dialogue system.

FIG. 7 shows, schematically a second example process for training a dialogue system, e.g., the dialogue system 100, to conduct a dialogue. The process of FIG. 7 can be performed by a system of one or more computers located in one or more locations. FIG. 7 shows an example implementation of the process of FIG. 6; the implementation steps described below can be performed in the context of the process of either FIG. 6 or FIG. 7. The processes shown schematically in FIG. 7 can be divided between components differently to the illustrated example.

In FIG. 7 a reinforcement learning environment 700 includes a dialogue buffer 702 (i.e., memory) configured to store a plurality of trajectories. In this example a trajectory comprises the context input for the current dialogue iteration, the natural language output statement, and (optionally) the first reward and the second reward. At the start of a dialogue the dialogue buffer may optionally be initialized with one or more turns of initial dialogue.

In the illustrated example the reinforcement learning environment 700 also includes reward models 704, i.e., the response selection neural network 120 and/or the rule violation detection neural network 130, that generate rewards as previously described.

The action selection policy neural network, i.e., the language generation neural network 110, can be trained on the stored trajectories using a reinforcement learning technique as described above. For example the learnable parameters of the action selection policy neural network, i.e., of the language generation neural network 110, can be updated by a learner 706 using the reinforcement learning technique; the learner 706 may be implemented by the training engine 150.

In some implementations trajectories are stored in the dialogue buffer conditionally upon a reward value for the trajectory being greater than a minimum reward threshold. The reward value for the trajectory may be determined, e.g., from one or both of the first reward and the second reward in the trajectory. Storage of a trajectory may also be conditional on the trajectory having a valid format.

Where the natural language output statement to include in a trajectory is a search query statement, comprising a search query for querying a search system, the trajectory may include a corresponding search result. This may involve providing the search query to the search system interface 140 for querying the search system, receiving one or more search results from the search system interface 140 in response to the search query, and including the search query and data from one or more of the search results in the trajectory stored in the dialogue buffer 702. Determining the context input for a dialogue iteration, such as an initial or current dialogue iteration, may then comprise retrieving data for the context input, including the search query and data from one or more of the search results, from the stored trajectory.

As previously described, some implementations of the system/method can learn through self-play. This may comprise, for one or more rounds of agent-user dialogue, obtaining the natural language output statement for the agent at an agent dialogue update iteration (i.e., where the output is for the agent role), and obtaining the natural language output statement for the user at a user dialogue update iteration (i.e., where the output is for the user role) coming after the agent dialogue update iteration, as a response to the natural language output statement for the agent. The action selection policy neural network can then be trained based on the first reward and the second reward for the agent dialogue update iterations, and trained based on the first reward and not on the second reward for the user dialogue update iterations.

Some implementations of the method/system use "red-teaming" to improve the training process. Thus in implementations determining the context input for a dialogue iteration, in particular for an initial dialogue iteration, involves generating a natural language request using a fourth, "red team" trained natural language generation neural network. In broad terms the "red team" natural language generation neural network has been trained to generate language that will cause a dialogue system comprising the first, second, and third language generation neural networks to fail to generate acceptable responses. More particularly the fourth trained natural language generation neural network has been trained, e.g., fine tuned, to generate red-team natural language statements, e.g., requests that when processed by the first or another language generation neural network, in particular in combination with a context input, cause the first or other language generation neural network to generate a natural language output statement that (in combination with the context input) violates one or more rules implemented by the rule violation detection neural network. One or more of the red-team natural language statements may then be included in the context input for a dialogue iteration, e.g., the initial dialogue iteration.

Figure 8:
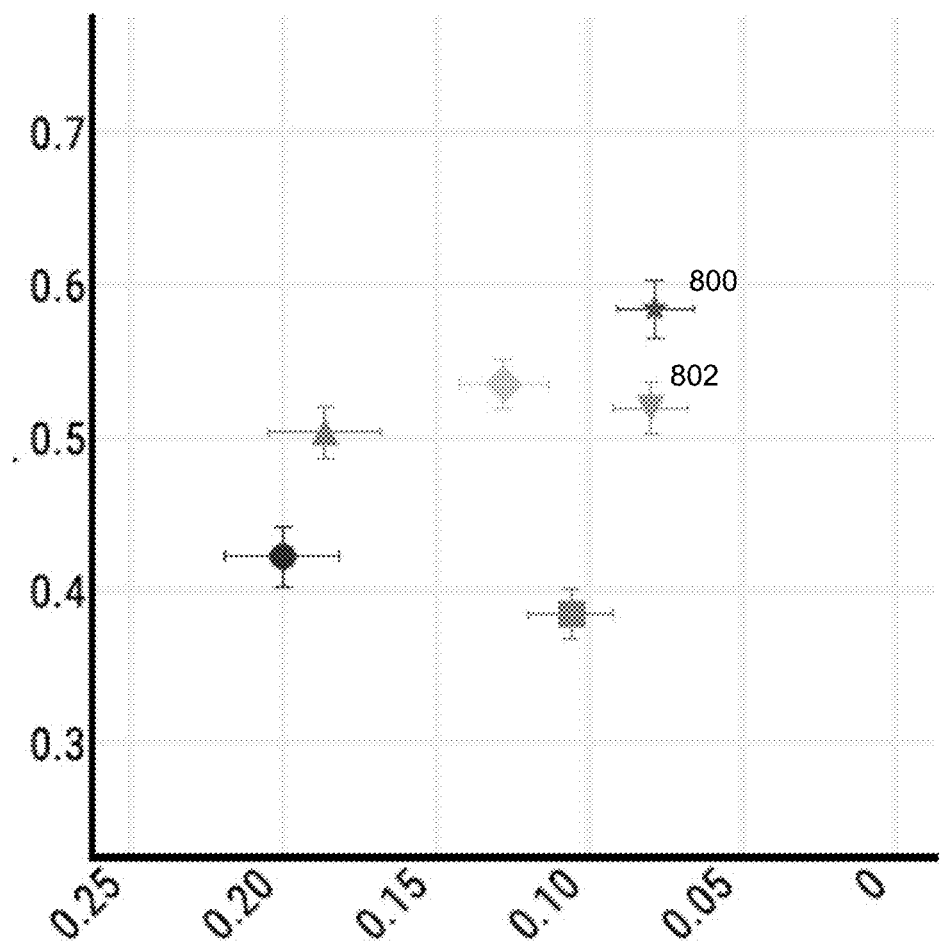
FIG. 8 illustrates the performance of example implementations of the dialogue system.

FIG. 8 illustrates the performance of example implementations of the dialogue system 100. In FIG. 8 the y-axis shows a relative preference rate for the natural language output from a dialogue system in a three-way comparison amongst other dialogue systems, and the x-axis shows a rule violation rate of the dialogue system under adversarial probing. Points 800 and 802 are for implementations of a dialogue system as described herein with, respectively, 8 and 2 samples drawn from the language model neural network 110 (see the description of FIG. 4), whilst the other points are for other systems. It can be seen that implementations of the dialogue system 100 are able to generate language responses that are both preferred by human users and also have a low rate of rule violation.

The first trained language generation neural network 110 may have been trained or fine-tuned on a corpus of language relating to the operation of a controller configured to control actions in a real-world environment to perform a task. For example first language generation neural network 110 may be initialized with an instance of a language generation neural network trained in this way, and then fine tuned as described above. The controller may control the actions of a mechanical system, which may also be termed a mechanical agent, such as a robot or vehicle, or manufacturing actions of a manufacturing plant, and the search system may be configured to return search results that relate to the operation of the controller. Implementations of the dialogue system 100 may be used, e.g., to provide an intuitive user interface for interrogating the operation of the controller, e.g., for fault finding or other purposes.

In general, e.g., in the examples below, the initial context input, or one or more of the natural language requests received by the dialogue system 100 from a user, may include or consist of one or more sequences of letters or numbers, e.g., that describe or encode observations of a real world environment. In general, e.g., in the examples below, one or more of the natural language replies provided to a user from the dialogue system 100 (and hence also the above described natural language responses) may include or consist of one or more sequences of letters or numbers, e.g., that describe or encode actions to be performed in a real-world environment, e.g., structured natural language or computer code.

In some implementations the context input, e.g., the natural language request, comprises one or more natural language statements relating to an environment, in particular a real-world environment, and includes a natural language request relating to the environment. That is the initial context input may comprise one or more natural language statements relating to the environment and may be updated to include the natural language request, which may thus request information relating to the environment. Similarly the natural language reply or natural language output statement then also relates to the environment, e.g., it can provide information relating to the environment, in some implementations relating to or specifying actions to be taken in the environment. As one example, a natural language request may specify a goal to be achieved and, optionally, features of a real-world environment, and the natural language reply may specify one or more actions to be taken to achieve the goal. The rules may be general rules, like the foregoing examples, or specific to the environment or to the goal, e.g., specifying one or more constraints on the actions to be taken to achieve the goal.

In some implementations the environment is a real-world environment and the method (or a corresponding system) is used for diagnosing a fault in a mechanical system operating in the real world environment. Then obtaining the context input, e.g., the initial context input, may comprise obtaining from one or more sensors, e.g., as described below, one or more observations of the mechanical system (which here includes observations of the operation of mechanical system). These can be processed, e.g., as described below, to generate a natural language representation of the one or more observations that is used to provide one or more of the natural language statements of the context information. In these implementations the natural language request can relate to the operation of the mechanical system and the natural language reply or the natural language output statement is used to identify a fault in the mechanical system. For example the request may comprise a general question such as "Is the system working correctly?" or "What is wrong with the system 48" or a specific request such as "Is there a fault with component X?". The reply can provide a natural language response to the request. Optionally one or more rules may, e.g., specify constraints on the mechanical system or on possible replies. The ability to hold a dialogue with the agent comprising the first (trained) language generation neural network facilitates homing in on a particular fault diagnosis. The diagnosis can use information stored within the trained language generation neural network and can use the ability to search an external data store to supplement the stored information with more comprehensive or more recent information as needed.

As another example, the environment can be a computer security monitoring environment, e.g., the system can be deployed as part of a system that monitors the security of one or more computers. For example, the environment may be a computer network security monitoring environment, and the system can be deployed as part of a system that monitors the security of one or more computers on a computer network, e.g., a wireless network, a cellular network, a local area network and/or the internet. As another example, the environment may alternatively or additionally be a computer system security monitoring environment and the system can be deployed as part of a system that monitors the system for the presence of computer viruses and/or an unresolved software vulnerability, e.g., a zero-day exploit. A software vulnerability may be resolved by updating the software (e.g., patching) and/or removing (e.g., uninstalling) the software from the computer system. In these examples, the natural language request can query whether a computer security incident has been resolved (e.g., "has the incident been resolved?"); the context input and/or natural language request may include relevant statements from system logs, i.e., that are potentially relevant to the event being queried.

The initial context input may define features of the computer system and/or software environment. A computer security incident can be, e.g., a data breach, an unauthorized log-in or other access of a secured system, a detection of a computer virus or detection of a software vulnerability. The incident can be "resolved" when the underlying incident is no longer a threat to the security of the computer system, e.g., the computer virus has been removed, the access to the secured system has been removed, the data breach has been mitigated, or the software having the vulnerability has been updated or removed. The system can use the context input to generate a reply to the request that comprises a natural language statement indicating whether the incident has been resolved, optionally displaying evidence used to determine this. The rule(s) may specify constraints in the computer system and/or software environment or on possible replies.

The context input, e.g., the initial context input, may include one or more of: code snippets from the software code, system logs, program logs, or other artifacts that should be left on the computer by running the program, or verification rules that represent requirements for the execution of the software program, or natural language statements describing the computer system on which the software executes. In general the context input may include relevant statements, i.e., statements that are potentially relevant to the event being queried.

In some implementations obtaining the context input, e.g., the initial context input, may comprise obtaining, from the system logs, the data characterizing the computer network, or both, or from other data as described above, one or more observations of the computer network (which here includes computers on the network), and processing the one or more observations to generate a natural language representation of the one or more observations. The natural language request may relate to the computer security incident or to the secure operation of the computer network A process implemented by the dialogue system 100 may include using the natural language representation of the one or more observations to provide one or more of the natural language statements of the context information, and using the natural language reply or the natural language output statement to identify a security status of the computer network or a security flaw in the computer network.

As another example, the environment can be a software testing or evaluation environment, e.g., the system can be deployed as part of a system that tests software before deployment or that evaluates already-deployed software to identify bugs. In these examples, when the system tests software before deployment, the natural language request can ask whether the software will execute as intended, and the context input, e.g., the initial context input, can include code snippets from the software code and, optionally, natural language statements describing the computer system on which the software will execute. The system can then use the context input to generate a reply that indicates whether the code will execute as intended, optionally displaying evidence used to determine this. When the system monitors the execution of code after deployment, the natural language request can ask whether a software program, or a portion of a software program, has executed as intended, and the context input can include one or more of: code snippets from the software code, system logs, program logs, or other artifacts that should be left on the computer by running the program, or verification rules that represent requirements for the execution of the software program, or natural language statements describing the computer system on which the software executes. The system can then use the context input to generate a reply that indicates whether the code has executed as intended, optionally displaying evidence used to determine this. As a particular example, the software program can be part of the boot up of a computer, and the system can generate a reply each time that the computer starts up to verify whether the computer will function correctly after start up. Again the rule(s) may specify constraints in the computer system and/or software environment or on possible replies As another example, the environment can be an educational environment, e.g., the system can be deployed as part of an education software program that assists a user in learning or practicing one or more corresponding skills. In these examples, the context input can include natural language statements describing or referencing a scenario or scene in a real-world or imagined environment, and the request can be a question about the scenario or scene.

As another example, the environment can be an information retrieval environment, e.g., the system can be deployed as part of a search engine or other software that allows a user to search for information in a corpus of documents, e.g., the Internet or another electronic document corpus. In these examples, the request can be any appropriate natural language question, and the reply can optionally include evidence such as include relevant statements from the corpus of documents, e.g., as identified by searching the corpus using conventional information retrieval techniques.

In some further applications the method, or a corresponding system, is used for natural language control of a task in a real-world environment. That is, the natural language request may relate to the task, e.g., it may comprise a request to perform the task, and the reply, i.e., the information provided by the method/system in the reply, may be used to control, e.g., a mechanical system (which may be referred to as a mechanical agent), or a computer system for performing the task.

As one example, the natural language request may comprise a high level request, e.g., from a human, to perform a task, e.g., "How would you put the empty bottle in the bin?", "Bring me a glass of water", or Can you put the vacuum cleaner in the cupboard?". The or each natural language reply may define one or more steps of the task, which may then be interpreted by the mechanical system, more specifically a control system of the mechanical system, to perform the step of the task. For example such a control system may convert the natural language reply into a series of primitive actions to be performed by the mechanical system to perform the step of the task.

Thus in some implementations the method, or a corresponding system, is used for controlling a mechanical system, or mechanical agent, acting in a real world environment to perform a task. The mechanical system may be, e.g., a robot or an autonomous or semi-autonomous vehicle. Determining, the context input, e.g., the initial context input, may comprise obtaining, from one or more sensors, one or more observations of the real world environment, and processing the one or more observations to generate a natural language representation of the one or more observations. Merely as one example, an image captioning model (which here includes a video captioning model) can be used to process an image in this way; other models can be trained to perform a corresponding task for other types of sensor/sensed data than images. The natural language representation of the one or more observations can be used to provide one or more natural language statements for the initial context input. The natural language request may relates to an action to be performed by the mechanical system. The natural language reply (or the natural language output statement) may be used to control the mechanical system in the real world environment. For example the reply may define an action to control movement or navigation of the robot or vehicle in the real-world environment. Such an action may be a high level action or "skill" that may be translated into one or more lower level or "primitive" actions, e.g., by a trained neural network.

In some implementations the mechanical system has a control system to control actions of the mechanical system. Receiving the natural language request may comprise receiving a control signal from the control system and generating the natural language request from the control signal. For example there may be a dialogue between the agent comprising the first (trained) language generation neural network and the mechanical system and/or a human (e.g., if a control system of the mechanical system has a human user interface). The previously described rules or preferences (preference scores) may impose constraints on actions to be taken, e.g., for safety or other reasons.

The mechanical system, hereafter also termed the mechanical agent, may include one or more sensors that capture observations of the environment, e.g., at specified time intervals, as the mechanical agent navigates through the environment or attempts to perform a task in the environment.

For example, the observations may include, e.g., one or more of: images, object position data, and sensor data to capture observations as the mechanical agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In the case of a robot or other mechanical agent or vehicle the observations may similarly include one or more of the position, linear or angular velocity, force, torque or acceleration, and global or relative pose of one or more parts of the mechanical agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the mechanical agent or data from sensors that are located separately from the mechanical agent in the environment.

The mechanical agent may be associated with a control system that generates control signals for controlling the mechanical agent using the observations generated by the sensors. In particular, the control system may generate control signals that cause the mechanical agent to follow a planned trajectory through the environment by first determining an appropriate action for the mechanical agent to perform, e.g., as part of performing a specified task, e.g., navigating to a particular location, identifying a particular object, moving a particular object to a given location, manipulating a particular object in some way, and so on, and then generating control signals that cause the mechanical agent to perform the action.

Such a control system can be deployed on-board the mechanical agent or can be deployed remotely from the mechanical agent and can transmit the control signals to the mechanical agent over a data communication network.

The control signals can be control inputs to control the mechanical agent. For example, when the mechanical agent is a robot the control signals can be, e.g., torques for the joints of the robot or higher-level control commands. As another example, when the mechanical agent is an autonomous or semi-autonomous land, air, sea vehicle, the control signals can include actions to control navigation, e.g., steering, and movement of the vehicle, e.g., braking and/or acceleration of the vehicle. For example, the control signals can be, e.g., torques to the control surface or other control elements, e.g., steering control elements of the vehicle, or higher-level control commands.

In other words, the control signals can include, for example, position, velocity, or force/torque/acceleration data for one or more joints of a robot or of parts of another mechanical agent (system).

In these examples, like the control system, software to implement a method as described herein ("system software") can be deployed on-board the mechanical agent or can be deployed remotely from the mechanical agent.

In these implementations, the system software may be used to provide an additional layer of control on top of the control system and the system software or another component can determine the request based on information received by the control system. For example, the request may be determined by receiving a control signal from the mechanical agent control system, and then determining one or more natural language requests, e.g., relating to the mechanical agent in the environment, from the control signal. The reply may be used to control the mechanical system.

In some implementations, the mechanical agent control system is an autonomous or semi-autonomous control system, e.g., that autonomously or semi-autonomously controls navigation or other actions of the mechanical agent, e.g., vehicle. Also or instead the mechanical agent control system may have an interface to receive control commands, e.g., from a human operator.

In these applications the described system software may be used to provide an additional layer of control, e.g., for safety purposes. For example the described system software may be used to inhibit control of the mechanical agent in a way that could be dangerous or contrary to one or more rules or preferences (as defined by preference scores). Rules relating to control of the mechanical agent may be entered explicitly, e.g., as natural language statements. As one example, such rules or preferences (preference scores) may include rules/preferences relating to permitted movement of a vehicle, such as traffic rules, or of a robot, e.g., related to permitted (or forbidden) or preferable rules relating to safe movements or types of task. Such rules/preferences may include rules/preferences relating to decisions to be made to ensure safe behavior of the mechanical agent, e.g., to inhibit damage to the mechanical agent or to a human.

Thus, each request may relate to an action to be performed by the mechanical agent, e.g., an action that is under consideration by the control system. For example, a request can define an action to be performed by the mechanical agent, e.g., in the form of a question such as "Do I turn left?" or "Is it safe for the agent to turn left?". As another example, a request can ask what action is to be performed by the mechanical agent, e.g., "Which way should the mechanical agent turn?". In the case of a robot, the request can relate to a sub-task of a series of sub-tasks that are to be performed to perform a task, e.g., "What do I do next?" or "Do I pick up object X?". The sub-tasks may themselves comprise a series of primitive actions for moving parts of the robot, e.g., to open grippers.

In general, the request can include a natural language description that defines information the reply from the system software is to provide. That is, the request can explicitly or implicitly determine what is required from the reply.

The reply to the request may be used to control the mechanical agent in the real world environment. More specifically, the reply may be used to control an action to be performed by mechanical agent. As one example, the reply may inhibit an action that would otherwise be performed, i.e., the response may determine whether or not an action defined by the request is performed. As another example the reply may define an action to be performed, e.g., where the request implicitly or explicitly requests an action to be determined.

In such implementations, obtaining the context input can include obtaining one or more observations of the real world environment which, because the environment includes the mechanical agent, potentially includes one or more observations of the mechanical agent. The observations may be obtained from one or more sensors that may, but need not be, sensors of the mechanical agent. As described above, the observations may include still or moving images, and/or other sensor data from one or more sensors sensing a state of the environment or mechanical agent. As used herein "images" includes LIDAR point clouds.

The one or more observations are processed, e.g., by a first machine learning model, to generate a natural language representation of the one or more observations, i.e., to generate natural language text describing the observation, that is included in the context input.

There are many different types of machine learning model that may be used to achieve this. For example so called visual language models are typically configured to describe an image or video using natural language, e.g., to perform an image or video captioning task. More generally, such models can perform many different types of image processing task by formulating the task as a text generation problem, e.g., to detect or classify objects in an image or video. Correspondingly other machine learning models can be trained to generate natural language text describing the data from other types of sensor, e.g., to represent a physical position or force as a natural language statement that describes, e.g., the mechanical agent or environment or a part thereof. The natural language representation of the one or more observations is used to provide one or more of the natural language statements in the context input.

The rules or preferences (preference scores) may relate to the current location of the mechanical agent in the environment and may not be directly generated from the observations generated by the sensors.

Merely as examples, rules or preferences (preference scores) may include the rules of common knowledge, a driving rules manual, or may be hand-engineered or obtained from a knowledge graph or the Internet. Examples of such rules or preferences include "if the car's electrical systems are broken, the car is not safe to drive", "the speed limit in the current location is 30 mph," "right turns are allowed after stop at this red light," "turning across double yellow lines is prohibited," and so on. The system software can be used to limit the consequences of potential actions that are being considered by the control system before they are transmitted as control signals for the mechanical agent.

In some other implementations, the environment is a real-world environment that includes a manufacturing plant, e.g., a manufacturing plant for manufacturing a product, such as a chemical, biological, or mechanical product, or a food product. As used herein "manufacturing" a product also includes refining a starting material to create a product, or treating a starting material, e.g., to remove pollutants, to generate a cleaned or recycled product. The manufacturing plant may comprise a plurality of manufacturing units such as vessels for chemical or biological substances, or machines for processing solid or other materials. The manufacturing units are configured such that an intermediate version or component of the product is moveable between the manufacturing units during manufacture of the product, e.g., via pipes or mechanical conveyance. In implementations the system is used for controlling one or more of the manufacturing units or for controlling movement of the intermediate version or component of the product between the manufacturing units.

Thus, in these implementations, obtaining the context input may then comprise obtaining, from one or more sensors, one or more observations of the manufacturing units or of the movement. The sensors may comprise any type of sensor monitoring the manufacturing units or the movement, e.g., sensors configured to sense mechanical movement or force, pressure, temperature; electrical conditions such as current, voltage, frequency, impedance; quantity, level, flow/movement rate or flow/movement path of one or more materials; physical or chemical conditions, e.g., a physical state, shape or configuration or a chemical state such as pH; configurations of the units such as the mechanical configuration of a unit, or valve configurations; image or video sensors to capture image or video observations of the manufacturing units or of the movement; or any other appropriate type of sensor. In implementations the one or more observations are processed to generate a natural language representation of the one or more observations, e.g., as previously described. The natural language representation of the one or more observations is used to provide one or more of the natural language statements of the context information.

The request may relate to an action that controls operation of one or more of the manufacturing units or that controls the movement. The reply to the request is used to control operation of one or more of the manufacturing units or to control the movement. For example the reply to the request may be used to control, e.g., minimize, energy or other resource use, or to control the manufacture to obtain a desired quality or characteristic of the product. For example the actions may include actions that control items of equipment of the plant or actions that change settings that affect the manufacturing units or the movement of the product or intermediates or components thereof, e.g., to adjust or turn on/off items of equipment or manufacturing processes.

In some implementations the manufacturing plant has a plant control system to control the manufacturing units or to control the movement. The request may be generated by, e.g., in response to, receiving a control signal from the plant control system and generating a natural language request from the control signal. In a similar way to that previously described the plant control system may be autonomous, semi-autonomous, or human-controlled.

In a similar way to that previously described the system may implement rules or preferences, e.g., to control or limit energy or other resource allocation, or to ensure a target quality or characteristic of the product, or to constrain operation of the plant, e.g., of the manufacturing units, within safe bounds.

In some implementations the environment is the real-world environment of a service facility comprising a plurality of items of equipment, e.g., items of electrical equipment, e.g., electrical components, such as a server farm or data center, for example a telecommunications data center, or a computer data center for storing or processing data, or any service facility. The service facility may also include ancillary control equipment that controls an operating environment of the items of equipment, for example environmental control equipment such as temperature control, e.g., cooling equipment, or air flow control or air conditioning equipment. Then, obtaining the context input can include obtaining observations of a state of the environment may comprise any electronic signals representing the functioning of the facility or of equipment in the facility. For example a representation of the state of the environment may be derived from observations made by any sensors sensing a state of a physical environment of the facility or observations made by any sensors sensing a state of one or more of items of equipment or one or more items of ancillary control equipment. These include sensors configured to sense electrical conditions such as current, voltage, power or energy; a temperature of the facility; fluid flow, temperature or pressure within the facility or within a cooling system of the facility; or a physical facility configuration such as whether or not a vent is open. These are processed, e.g., as previously described, to generate a natural language representation of the one or more observations that is used to provide one or more of the natural language statements of the context information. The request can relate to the operation of the facility, e.g., to adjust the operation one or more items of equipment (e.g., electrical components) to control, e.g., minimize, use of a resource, such as a task to control use of electrical power or water. For example, the request can ask which components to turn on to decrease use of the resource, or whether it is safe to turn on or off a given component. The system can then determine how to operate the items of equipment based on the generated response, e.g., by turning on or off one or more components as indicated by the reply.

In some implementations the environment is the real-world environment of a power generation facility, e.g., a renewable power generation facility such as a solar farm or wind farm and the request can relate to how to control power generated by the facility, e.g., to control the delivery of electrical power to a power distribution grid, e.g., to meet demand or to reduce the risk of a mismatch between elements of the grid, or to maximize power generated by the facility.

In general observations of a state of the environment for the context input may comprise any electronic signals representing the electrical or mechanical functioning of power generation equipment in the power generation facility. For example a representation of the state of the environment may be derived from observations made by any sensors sensing a physical or electrical state of equipment in the power generation facility that is generating electrical power, or the physical environment of such equipment, or a condition of ancillary equipment supporting power generation equipment. Such sensors may include sensors configured to sense electrical conditions of the equipment such as current, voltage, power or energy; temperature or cooling of the physical environment; fluid, e.g., air or water, flow; or a physical configuration of the equipment; and observations of an electrical condition of the grid, e.g., from local or remote sensors. Observations of a state of the environment may also comprise one or more predictions regarding future conditions of operation of the power generation equipment such as predictions of future wind levels or solar irradiance or predictions of a future electrical condition of the grid.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are correspond toed in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes correspond toed in the accompanying figures do not necessarily require the particular order shown, or sequential order, to achieve desirable results. In some cases, multitasking and parallel processing may be advantageous.

What is claimed is:

1. A method, implemented by one or more computers, the method comprising:
   initializing a context input that represents a context for a dialogue between a user and the one or more computers, and,
   at one or more of a plurality of dialogue update iterations:
      receiving a natural language request from the user;
      updating the context input to include the natural language request;
      processing the context input using a first trained language generation neural network to generate a set of one or more first natural language responses without using a search system interface, wherein the first trained language generation neural network is a first auto-regressive neural network that includes a first succession of first self-attention neural network layers, and wherein each first self-attention neural network layer applies an attention mechanism over a first attention layer input for the first self-attention neural network layer to generate an attention layer output for each element of the first attention layer input;
      generating a set of one or more search queries from the natural language request;
      providing the one or more search queries to a search system using the search system interface, wherein the search system is external to the first trained language generation neural network;
      receiving, for each search query, a set of one or more search results from the search system via the search system interface;
      determining, from the context input and for each of the search results, a supported context input that includes content from one of the search results;
      for each supported context input that includes content from one of the search results, processing the supported context input using the first trained language generation neural network to generate a set of one or more second natural language responses, wherein each second natural language response includes a response to the natural language request including supporting evidence that comprises content from the one of the search results obtained by providing the one or more search queries to the search system using the search system interface;
      processing (i) at least a portion of the context input that includes the natural language request received by the user, (ii) the one or more first natural language responses generated without using the search system interface by the first trained language generation neural network in response to the context input, and (iii) the one or more second natural language responses generated by the first trained language generation neural network in response that each include a response to the natural language request including supporting evidence that comprises content from the one of the search results obtained by providing the one or more search queries to the search system using the search system interface in the content from the one using a trained response selection neural network to generate an output that defines a selection between the one or more first natural language responses and the one or more second natural language responses, wherein the trained response selection neural network is a second auto-regressive neural network that includes a second succession of second self-attention neural network layers, and wherein each second self-attention neural network layer applies an attention mechanism over a second attention layer input for the second self-attention neural network layer to generate an attention layer output for each element of the second attention layer input;
      selecting, based on the output of the trained response selection neural network and as a natural language reply, one of the one or more first natural language responses generated by the first trained language generation neural network in response to the context input and the one or more second natural language responses generated by the first trained language generation neural network in response to each supported context input;
      providing the natural language reply to the user as a response to the natural language user request; and
      updating the context input to include a representation of the natural language reply for the next dialogue update iteration.

2. The method of claim 1, wherein the set of one or more first natural language responses includes a plurality of first natural language responses; the set of one or more search queries includes a plurality of search queries; the set of one or more search results for each search query includes a plurality of search results; and the set of one or more second natural language responses comprises a plurality of second natural language responses.

3. The method of claim 1, further comprising, at the next dialogue update iteration:
   receiving a follow-up natural language request from the user;
   updating the context input to include the follow-up natural language request; then
   processing the context input using the first trained language generation neural network to generate one or more third natural language responses;
   generating one or more follow-up search queries from the follow-up natural language request;
   providing the one or more follow-up search queries to a search system interface;
   receiving, for each follow-up search query, one or more follow-up search results from the search system interface,
   determining, from the context input and for each of the follow-up search results, a follow-up supported context input that includes content from one of the follow-up search results;
   processing each follow-up supported context input using the first trained language generation neural network to generate one or more respective fourth natural language responses;
   processing the one or more third natural language responses and the one or more fourth natural language responses using the trained response selection neural network to select a follow-up natural language reply from the one or more third natural language responses and the one or more fourth natural language responses; and providing the follow-up natural language reply to the user as a response to the follow-up natural language request; and updating the context input to include a representation of the follow-up natural language reply.

4. The method of claim 1 wherein processing (i), (ii), and (iii) using the trained response selection neural network comprises:

for each first natural language response and each second natural language response:
processing the at least a portion of the context input and the natural language response using the trained response selection neural network to generate a preference score for the natural language response; and
selecting one of the first and second natural language responses, based on the preference scores for the first and second natural language responses, to select the natural language reply.

5. The method of claim 4, further comprising, for each first and second natural language response:

processing at least a portion of the context input and the natural language response using a trained rule violation detection neural network to determine, for each of a plurality of rules, a rule violation score that estimates a probability that the rule is violated; and wherein selecting one of the first and second natural language responses to select the natural language reply is further based on the rule violation score for each of the rules for each of the first and second natural language responses.

6. The method of claim 5, wherein selecting one of the first and second natural language responses to select the natural language reply comprises:

for each first and second natural language response:
determining a combined rule violation score for the natural language response by combining the rule violation score for each rule; and
combining the preference score and combined rule violation score for the natural language response to determine a re-ranking score; and
selecting one of the first and second natural language responses, based on the re-ranking scores for the first and second natural language responses, to select the natural language reply.

7. The method of claim 5, wherein determining the rule violation score that estimates a probability that the rule is violated comprises processing, for each of the plurality of rules, at least the portion of the context input, the natural language response, and a natural language representation of the rule, using the trained rule violation detection neural network, to determine the rule violation score that estimates the probability that the rule is violated.

8. The method of claim 7, wherein processing, for each of the plurality of rules, at least the portion of the context input, the natural language response, and the natural language representation of the rule comprises processing, for each of the plurality of rules, at least the portion of the context input, the natural language response, and the natural language representation of the rule, using the trained rule violation detection neural network, to generate one or more natural language output tokens representing a determination of whether or not the rule was violated; and determining the rule violation score from one or more output layer values corresponding to the one or more natural language output tokens.

9. The method of claim 7, wherein processing, for each of the plurality of rules, at least the portion of the context input, the natural language response, and the natural language representation of the rule comprises:

processing at least the portion of the context input and the natural language response to determine a shared intermediate state of the trained rule violation detection neural network; and processing, for each of the plurality of rules, the natural language representation of the rule starting from the shared intermediate state to generate the rule violation score.

10. The method of claim 8, wherein the first trained language generation neural network, the trained response selection neural network, and the trained rule violation detection neural network, each comprise a respective sequence-to-sequence neural network configured to receive an input sequence of tokens and to process the input sequence of natural language tokens in accordance with a respective set of neural network parameters, to generate an output sequence of natural language tokens, and wherein the first trained language generation neural network, the trained response selection neural network, and the trained rule violation detection neural network comprise a set of shared input layers.

11. The method of claim 1, wherein the first trained language generation neural network and the trained response selection neural network are stored on a user computing device; wherein the search system is remote from the user computing device; and wherein the one or more search results are received over a wired or wireless communications link between the user computing device and the search system.

12. A system comprising:

one or more computers; and one or more non-transitory storage devices communicatively coupled to the one or more computers, wherein the one or more storage devices store instructions that, when executed by the one or more computers, cause the one or more computers to perform operations comprising:

initializing a context input and, at one or more of a plurality of dialogue update iterations:
receiving a natural language request from the user;
updating the context input to include the natural language request;
processing the context input using a first trained language generation neural network to generate a set of one or more first natural language responses without using a search system interface, wherein the first trained language generation neural network is a first auto-regressive neural network that includes a first succession of first self-attention neural network layers, and wherein each first self-attention neural network layer applies an attention mechanism over a first attention layer input for the first self-attention neural network layer to generate an attention layer output for each element of the first attention layer input;
generating a set of one or more search queries from the natural language request;

providing the one or more search queries to a search system using the search system interface, wherein the search system is external to the first trained language generation neural network;

receiving, for each search query, a set of one or more search results from the search system via the search system interface;

determining, from the context input and for each of the search results, a supported context input that includes content from one of the search results;

for each supported context input that includes content from one of the search results, processing the supported context input using the first trained language generation neural network to generate a set of one or more second natural language responses, wherein each second natural language response includes a response to the natural language request including supporting evidence that comprises content from the one of the search results obtained by providing the one or more search queries to the search system using the search system interface;

processing (i) at least a portion of the context input that includes the natural language request received by the user, (ii) the one or more first natural language responses generated without using the search system interface by the first trained language generation neural network in response to the context input, and (iii) the one or more second natural language responses generated by the first trained language generation neural network in response that each include a response to the natural language request including supporting evidence that comprises content from the one of the search results obtained by providing the one or more search queries to the search system using the search system interface using a trained response selection neural network to generate an output that defines a selection between the one or more first natural language responses and the one or more second natural language responses, wherein the trained response selection neural network is a second auto-regressive neural network that includes a second succession of second self-attention neural network layers, and wherein each second self-attention neural network layer applies an attention mechanism over a second attention layer input for the second self-attention neural network layer to generate an attention layer output for each element of the second attention layer input;

selecting, based on the output of the trained response selection neural network and as a natural language reply, one of the one or more first natural language responses generated by the first trained language generation neural network in response to the context input and the one or more second natural language responses generated by the first trained language generation neural network in response to each supported context input;

providing the natural language reply to the user as a response to the natural language user request; and updating the context input to include a representation of the natural language reply for the next dialogue update iteration.

13. The method of claim 1, wherein the first succession of first self-attention layers are different instances of self-attention layers with the same architecture as the self-attention layers in the second succession of second self-attention layers.

14. The system of claim 12, wherein the first succession of first self-attention layers are different instances of self-attention layers with the same architecture as the self-attention layers in the second succession of second self-attention layers.

15. The system of claim 12, wherein the set of one or more first natural language responses includes a plurality of first natural language responses; the set of one or more search queries includes a plurality of search queries; the set of one or more search results for each search query includes a plurality of search results; and the set of one or more second natural language responses comprises a plurality of second natural language responses.

16. The system of claim 12, the operations further comprising, at the next dialogue update iteration:

receiving a follow-up natural language request from the user;

updating the context input to include the follow-up natural language request; then processing the context input using the first trained language generation neural network to generate one or more third natural language responses;

generating one or more follow-up search queries from the follow-up natural language request;

providing the one or more follow-up search queries to a search system interface;

receiving, for each follow-up search query, one or more follow-up search results from the search system interface, determining, from the context input and for each of the follow-up search results, a follow-up supported context input that includes content from one of the follow-up search results;

processing each follow-up supported context input using the first trained language generation neural network to generate one or more respective fourth natural language responses;

processing the one or more third natural language responses and the one or more fourth natural language responses using the trained response selection neural network to select a follow-up natural language reply from the one or more third natural language responses and the one or more fourth natural language responses; and providing the follow-up natural language reply to the user as a response to the follow-up natural language request; and updating the context input to include a representation of the follow-up natural language reply.

17. The system of claim 12, wherein processing (i), (ii), and (iii) using the trained response selection neural network comprises:

for each first natural language response and each second natural language response:

processing the at least a portion of the context input and the natural language response using the trained response selection neural network to generate a preference score for the natural language response; and selecting one of the first and second natural language responses, based on the preference scores for the first and second natural language responses, to select the natural language reply.

18. The system of claim 17, the operations further comprising, for each first and second natural language response:

processing at least a portion of the context input and the natural language response using a trained rule violation detection neural network to determine, for each of a plurality of rules, a rule violation score that estimates a probability that the rule is violated; and wherein selecting one of the first and second natural language responses to select the natural language reply is further based on the rule violation score for each of the rules for each of the first and second natural language responses.

19. The system of claim 18, wherein selecting one of the first and second natural language responses to select the natural language reply comprises:

for each first and second natural language response:
determining a combined rule violation score for the natural language response by combining the rule violation score for each rule; and
combining the preference score and combined rule violation score for the natural language response to determine a re-ranking score; and selecting one of the first and second natural language responses, based on the re-ranking scores for the first and second natural language responses, to select the natural language reply.

20. The system of claim 18, wherein determining the rule violation score that estimates a probability that the rule is violated comprises processing, for each of the plurality of rules, at least the portion of the context input, the natural language response, and a natural language representation of the rule, using the trained rule violation detection neural network, to determine the rule violation score that estimates the probability that the rule is violated.

21. The system of claim 20, wherein processing, for each of the plurality of rules, at least the portion of the context input, the natural language response, and the natural language representation of the rule comprises processing, for each of the plurality of rules, at least the portion of the context input, the natural language response, and the natural language representation of the rule, using the trained rule violation detection neural network, to generate one or more natural language output tokens representing a determination of whether or not the rule was violated; and determining the rule violation score from one or more output layer values corresponding to the one or more natural language output tokens.

22. The system of claim 20, wherein processing, for each of the plurality of rules, at least the portion of the context input, the natural language response, and the natural language representation of the rule comprises:

processing at least the portion of the context input and the natural language response to determine a shared intermediate state of the trained rule violation detection neural network; and processing, for each of the plurality of rules, the natural language representation of the rule starting from the shared intermediate state to generate the rule violation score.

23. The system of claim 21, wherein the first trained language generation neural network, the trained response selection neural network, and the trained rule violation detection neural network, each comprise a respective sequence-to-sequence neural network configured to receive an input sequence of tokens and to process the input sequence of natural language tokens in accordance with a respective set of neural network parameters, to generate an output sequence of natural language tokens, and wherein the first trained language generation neural network, the trained response selection neural network, and the trained rule violation detection neural network comprise a set of shared input layers.

24. The system of claim 12, wherein the first trained language generation neural network and the trained response selection neural network are stored on a user computing device; wherein the search system is remote from the user computing device;

and wherein the one or more search results are received over a wired or wireless communications link between the user computing device and the search system.

25. One or more non-transitory computer-readable storage media encoded with a computer program, the program comprising instructions that are operable, when executed by a data processing apparatus, to cause the data processing apparatus to perform operations comprising:

initializing a context input and, at one or more of a plurality of dialogue update iterations:
receiving a natural language request from the user;
updating the context input to include the natural language request;
processing the context input using a first trained language generation neural network to generate a set of one or more first natural language responses without using a search system interface, wherein the first trained language generation neural network is a first auto-regressive neural network that includes a first succession of first self-attention neural network layers, and wherein each first self-attention neural network layer applies an attention mechanism over a first attention layer input for the first self-attention neural network layer to generate an attention layer output for each element of the first attention layer input;
generating a set of one or more search queries from the natural language request;
providing the one or more search queries to a search system using the search system interface, wherein the search system is external to the first trained language generation neural network;
receiving, for each search query, a set of one or more search results from the search system via the search system interface;
determining, from the context input and for each of the search results, a supported context input that includes content from one of the search results;
for each supported context input that includes content from one of the search results, processing the supported context input using the first trained language generation neural network to generate a set of one or more second natural language responses, wherein each second natural language response includes a response to the natural language request including supporting evidence that comprises content from the one of the search results obtained by providing the one or more search queries to the search system using the search system interface;
processing (i) at least a portion of the context input that includes the natural language request received by the user, (ii) the one or more first natural language responses generated without using the search system interface by the first trained language generation neural network in response to the context input, and (iii) the one or more second natural language responses generated by the first trained language generation neural network in response that each include a response to the natural language request including supporting evidence that comprises content from the one of the search results obtained by providing the one or more search queries to the search system using the search system interface using a trained response selection neural network to generate an output that defines a selection between the one or more first natural language responses and the one or more second natural language responses, wherein the trained response selection neural network is a second auto-regressive neural network that includes a second succession of second self-attention neural network layers, and wherein each second self-attention neural network layer applies an attention mechanism over a second attention layer input for the second self-attention neural network layer to generate an attention layer output for each element of the second attention layer input;

selecting, based on the output of the trained response selection neural network and as a natural language reply, one of the one or more first natural language responses generated by the first trained language generation neural network in response to the context input and the one or more second natural language responses generated by the first trained language generation neural network in response to each supported context input;

providing the natural language reply to the user as a response to the natural language user request; and updating the context input to include a representation of the natural language reply for the next dialogue update iteration.

26. The one or more non-transitory computer-readable storage media of claim 25, wherein the set of one or more first natural language responses includes a plurality of first natural language responses; the set of one or more search queries includes a plurality of search queries; the set of one or more search results for each search query includes a plurality of search results; and the set of one or more second natural language responses comprises a plurality of second natural language responses.

27. The one or more non-transitory computer-readable storage media of claim 25, the operations further comprising, at the next dialogue iteration:

receiving a follow-up natural language request from the user;

updating the context input to include the follow-up natural language request; then processing the context input using the first trained language generation neural network to generate one or more third natural language responses;

generating one or more follow-up search queries from the follow-up natural language request;

providing the one or more follow-up search queries to a search system interface;

receiving, for each follow-up search query, one or more follow-up search results from the search system interface, determining, from the context input and for each of the follow-up search results, a follow-up supported context input that includes content from one of the follow-up search results;

processing each follow-up supported context input using the first trained language generation neural network to generate one or more respective fourth natural language responses;

processing the one or more third natural language responses and the one or more fourth natural language responses using the trained response selection neural network to select a follow-up natural language reply from the one or more third natural language responses and the one or more fourth natural language responses; and providing the follow-up natural language reply to the user as a response to the follow-up natural language request; and updating the context input to include a representation of the follow-up natural language reply.

28. The one or more non-transitory computer-readable storage media of claim 25, wherein processing (i), (ii), and (iii) using the trained response selection neural network comprises:

for each first natural language response and each second natural language response:

processing the at least a portion of the context input and the natural language response using the trained response selection neural network to generate a preference score for the natural language response; and selecting one of the first and second natural language responses, based on the preference scores for the first and second natural language responses, to select the natural language reply.

29. The one or more non-transitory computer-readable storage media of claim 28, the operations further comprising, for each first and second natural language response:

processing at least a portion of the context input and the natural language response using a trained rule violation detection neural network to determine, for each of a plurality of rules, a rule violation score that estimates a probability that the rule is violated; and wherein selecting one of the first and second natural language responses to select the natural language reply is further based on the rule violation score for each of the rules for each of the first and second natural language responses.

30. The one or more non-transitory computer-readable storage media of claim 29, wherein selecting one of the first and second natural language responses to select the natural language reply comprises:

for each first and second natural language response:

determining a combined rule violation score for the natural language response by combining the rule violation score for each rule; and combining the preference score and combined rule violation score for the natural language response to determine a re-ranking score; and selecting one of the first and second natural language responses, based on the re-ranking scores for the first and second natural language responses, to select the natural language reply.

* * * * *